United States Patent [19]
Abu-Amara et al.

[11] Patent Number: 5,949,778
[45] Date of Patent: Sep. 7, 1999

[54] HIGH PERFORMANCE FAULT TOLERANT SWITCHING SYSTEM FOR MULTIMEDIA SATELLITE AND TERRESTRIAL COMMUNICATIONS SWITCHES

[75] Inventors: Hosame Hassan Abu-Amara, Richardson; Venkat Kotamarti, Dallas, both of Tex.

[73] Assignee: Northern Telecom Limited, Montreal, Canada

[21] Appl. No.: 08/775,613

[22] Filed: Dec. 31, 1996

[51] Int. Cl.[6] .............................. H04J 3/02; H04L 12/56
[52] U.S. Cl. ............................................. 370/388; 370/411
[58] Field of Search .................................... 370/388, 389, 370/395, 411

[56] References Cited

U.S. PATENT DOCUMENTS

| | | | |
|---|---|---|---|
| 5,018,129 | 5/1991 | Netravali et al. | 370/388 |
| 5,519,694 | 5/1996 | Brewer et al. | 370/351 |
| 5,521,591 | 5/1996 | Arora et al. | 370/351 |

OTHER PUBLICATIONS

J. Huang et al., "Broadband Satcom System for Mutlimedia Services," IEEE 1996, pp. 906–910.
A. Itoh, "A Fault–Tolerant Switching Architecture for ATM Networks," NTT Communications Switching Laboratories, IEEE 1992, pp. 1639–1645.
S.W. Seo et al., "Modified Composite Banyan Network With an Enhanced Terminal Reliability," Computer Communications, vol. 17, No. 10, Oct. 1994, pp. 750–757.
A. Baicchi et al., "Modelling and Dimensioning of an Integrated Circuit and Packet Switching Scheme On–Board a Processing Satellite," IEEE 1996, pp. 936–941.
J. Hickey et al., "The Architecture of the Sunshine Broadband Testbed," ISS, Oct. 1992, vol. 1, pp. 203–208.
R. Awdeh et al., "Survey of ATM Switch Architectures," Computer Networks and ISDN Systems, Nov. 1995, No. 12, pp. 1567–1613.
S.M. Shen et al., "DbDest: An Efficient, High–Performance, Fault–Tolerant Fabric for Broadband ISDN," IEEE 1995, pp. 1142–1146.
G. Bianchi et al., "Architecture and Performance of Non-blocking ATM Switches with Shared Internal Queuing," Computer Networks and ISDN Systems, Apr. 1996, No. 6, pp. 835–853.
T. Lee et al., "Broadband Packet Switches Based on Dilated Interconnection Networks," IEEE 1994, pp. 732–744.
Ahmadi et al, A Survey of Modern High–Performance Switching Techniques, IEEE Journal on Selected Areas in Communications, vol. 7, No. 7, Sep. 1989, pp. 1091–1103.
Arthurs, et al, HYPASS: An Optoelectronic Hybrid Packet Switching System, IEEE Journal on Selected Areas in Communications, vol. 6, No. 9, Dec. 1988, pp. 1500–1510.
Chao, A Novel Architecture for Queue Management in the ATM Network, IEEE Journal on Selected Areas in Communications, vol. 9, No. 7, Sep. 1991, pp. 1110–1118.
Chao, A Novel Architecture for Queue Management in the ATM Network, IEEE Journal on Selected Areas in Communications, vol. 9, No. 7, Sep. 1991, pp. 1110–1118.

(List continued on next page.)

*Primary Examiner*—Min Jung
*Attorney, Agent, or Firm*—John D. Crane; Daniel E. Venglarik; Andrew J. Dillon

[57] ABSTRACT

An apparatus for routing a plurality of cells. The apparatus includes a plurality of inputs, wherein the plurality of cells are received at the inputs. Each of the cells contains routing information. The apparatus also includes a plurality of outputs, wherein the outputs are associated with a plurality of destinations such that each output corresponds to a destination within the plurality of destinations. The apparatus employs a routing means for routing the cells received by the inputs through the apparatus to the outputs using the routing information contained in the cells. The routing means includes a number of single path switching matrixes in which each single path switching matrix has a plurality of stages. A portion of the these stages are dilated such that two or more cells may be routed to the same destination.

33 Claims, 25 Drawing Sheets

OTHER PUBLICATIONS

Chen, et al, High–Throughput Cell Scheduling for Broadband Switching Systems, IEEE Journal on Selected Areas in Communications, vol. 9, No. 9, Dec. 1991, pp. 1510–1523.

Devault, et al, The "Prelude"ATD Experiment; Assessments and Future Prospects, IEEE Journal on Selected Areas in Communications, vol. 6, No. 9, Dec. 1988, pp. 1528–1537.

Eng, A Photonic Knockout Switch for High–Speed Packet Networks, IEEE Journal on Selected Areas in Communications, vol. 6, No. 7, Aug. 1988, pp. 1107–1116.

Giacopelli, et al, Sunshine: A High–Performance Self–Routing Broadband Packet Switch Architecture, IEEE Journal on Selected Areas in Communications, vol. 9, No. 8, Oct. 1991, pp. 1289–1298.

Hluchyj, et al, Queueing in High–Performance Packet Switching, IEEE Journal on Selected Areas in Communications, vol. 6, No. 9, Dec. 1988, pp. 1587–1597.

Hui,*Switching Integrated Broadband Services by Sort–Banyan Networks*, Proceedings of the IEEE, vol. 79, No. 2, Feb. 1991, pp. 145–154.

Karol, et al, Input Versus Output Queueing on a Space–Division Packet Switch, IEEE Transactions on Communications, vol. COM–35, No. 12, Dec. 1987, pp. 1347–1356.

Lee, A Modular Architecture for Very Large Packet Switches, IEEE Transactions on Communications, vol. 38, No. 7, Jul. 1990, pp. 1097–1106.

Narasimha, A Recursive Concentrator Structure with Applications to Self–Routing Switching Networks, IEEE Transactions on Communications, vol. 42, No. 2/3/4, Feb./Mar./Apr. 1994, pp. 896–898.

Suzuki, et al, Very High–Speed and High–Capacity Packet Switching for Broadband ISDN, IEEE Journal on Selected Areas in Communications, vol. 6, No. 9, Dec. 1988, pp. 1556–1564.

HIGH PERFORMANCE FAULT TOLERANT SWITCHING SYSTEM FOR MULTIMEDIA SATELLITE AND TERRESTRIAL COMMUNICATIONS SWITCHES

BACKGROUND OF THE INVENTION

1. Technical Field

The present invention relates generally to a communications system and in particular to a method and apparatus for routing data within the communications system. Still more particularly, the present invention relates to a switching system employed for routing cells from a source to a destination in a communications system.

2. Description of the Related Art

Factors driving the need for broadband communications arise from changing user needs and demands. Previously, public network needs were driven by telephoning, voice data. Data traffic has grown slowly until recently. With the lower cost in telecommunications and the higher increase in processing power of computers, the numbers of users accessing communications networks has increased. The needs of these users include, for example, video telephone, low cost video conferencing, imaging, high definition television (HDTV), and other applications requiring multimedia data transfers. Multimedia combines different forms of media in the communication of information between a user and a data processing system, such as a personal computer. A multimedia application is an application that uses different forms of communications within a single application. Multimedia applications may, for example, communicate data to a user on a computer via audio, text, and video simultaneously. Such multimedia applications are usually bit intensive, real time, and very demanding on communications networks. A number of definitions have been given for broadband service. One example is the International Telecommunications Union (ITU, formerly known as CCITT), which defines broadband service as a service requiring transmission channels capable of supporting rates greater than 1.5 Mbps or a primary rate in ISDN or T1 or DS1 in digital terminology. A broadband integrated services digital network (BISDN) technology framework involves asynchronous transfer mode (ATM) as a protocol for coordinating information flow at a source and destination node. For terrestrial networks, synchronous optical network (SONET), a standard for fiber optical transmission mediums form the backbone technology for BISDN. More information on broadband communications can be found in Kumar, *Broadband Communications: A Professional's Guide to (ATM) Frame Relay, SMDS, SONET, and BISDN,* McGraw-Hill, Inc., New York, (1995).

The progress in fiber optic and network technologies have made BISDN a commercial reality and has made possible sophisticated computer applications, such as the transmission of video, voice, and other data over computer networks. ATM is the most common switching technique used by broadband networks to integrate a variety of multirate services, ranging from high speed video services and computer communications to low speed voice services, into a single high speed network.

Currently, the ATM standard defined by ITU specifies fixed packet sizes (cells) consisting of 5 bytes in a control field and 48 bytes in a data field and supports line speeds of up to 150 Mbps, 600 Mbps, or above. ATM networks are packet-oriented, in which information is packetized, carried in fixed length cells, and transmitted in a slot by slot fashion. Most integrated services provided by BISDN falls into two major categories. In the first category, circuit emulation type, also called connection oriented, requires reserving the bandwidth for the whole duration of the connection because extremely low cell loss rates, such as less than 1e-11, is crucial. In the second category, the connectionless type, the bandwidth requirement is unpredictable and bursty, such as in intercomputer data communication, but a certain degree of cell loss is tolerable, such as less than 1e-6. In networks that provide both types of services, it is very common and desirable to assign higher priority to the cells of connection-oriented services than to the cells of connectionless services.

To meet high speed transmission demands, ATM employs a hardware-based fast packet switching technique that allows cells to be self-routed from input ports through an interconnection network to output ports by using the destination address information stored in cell headers. Carrying large amounts of information over long distances with the help of high bandwidth satellites or fiber optics is straight forward, but the switching of high-speed packet flows is a challenging task.

The design of BISDN and ATM switches is made more difficult by the requirement that customer expectations be met and the network be used efficiently. One way to satisfy customer expectations is for the switches to ensure that the quality of service (QoS) parameter values for the multimedia services are not exceeded. A further complication of switch design is that the switches are required to have a high degree of fault-tolerance. Modern satellite systems, such as Teledesic and Advanced Satcom, have ATM switches on board the satellites. ATM networks and these types of satellites carry a large volume of integrated multimedia traffic. As a result, a failure in the switches can be catastrophic for a large number of users. Additionally, networks including satellite switches impose other complications on switch design. If the ATM switch is to be implemented on board the satellite, then the ATM switch must be as small as possible and must be implemented in technologies that consume as little power as possible.

Several switch architecture designs exist for BISDN and ATM networks. These architectures can be classified into three categories: (1) wavelength switching architectures; (2) time switching architectures; and (3) space switching architectures. More information about digital switching architectures can be found in G. Fantauzzi, *Digital Switching Control Architectures,* Artech House Inc., Norwood, Mass., 1990. The wavelength switching architecture, like the photonic knockout switch, and the HYPASS use wavelength division multiplexing techniques to switch cells. More information on the photonic knockout switch and the HYPASS switch may be found in K. Y. Eng, *A Photonic Knockout Switch for High-Speed Packet Networks,* IEEE J. Select. Areas Commun., Vol. 6, pp. 1107–1116, August 1988, and E. Arthurs, M. S. Goodman, H. Kobrinski, and M. P. Veechi, HYPASS. *An Optoelectronic Hybrid Packet Switching System,* IEEE J. Select. Areas Commun., Vol. 6, pp. 1500–1510, December 1988, respectively. The drawback of these designs is the requirement of a wide-range agile tunable laser and slot synchronization, which prevent the switch from high speed operation. For time switching architectures, components are shared, thus restricting the overall system throughput. For example, the PARIS switch relies on a shared high speed bus, the Prelude switch is based on a shared memory, and the HPS switch requires multiple shared rings. More information on these switches may be found in H. Ahmadi, and W. E. Denzel, *A Survey of Modern High-Performance Switching Techniques,* IEEE Select. Areas Commun, Vol. 7, pp. 1091–1103, September 1989; M.

Devault, J. Y. Cochennec, and M. Servel, *The Prelude ATD Experiment: Assignments and Future Prospects,* IEEE J. Select. Areas Commun, Vol. 6, pp. 1528–1537, December 1988; H. Suzuki, T. Takeuchi, F. Akashi, and T. Yamaguchi, *Very High-Speed and High-Capacity Packet Switching for Broadband ISDN,* IEEE J. Select. Areas Commun., Vol. 6, pp. 1556–1564, December 1988, respectively. Space switching has the merit of allowing high speed operation and is most appropriate for BISDN and ATM networks. According to hardware complexity, space switching can be subdivided into three categories: (1) $N^2$ disjoint path switching; (2) crossbar switching; and (3) banyan-based switching. Compared with $N^2$ disjoint path switching and crossbar switching, banyan-based switching requires a small number of switch elements, and has a consistent path link and transit time for input and output pairs. Additionally, the switch elements operate without knowing the full address of the output ports. Thus, banyan-based switches are the most economical and efficient for BISDN and ATM networks.

Previous banyan-based switches, such as the existing SunShine switch architecture, require a large amount of hardware, have a large end-to-end delay, do not tolerate faults, or require expensive implementation technology. More information on SunShine switch architecture may be found in J. N. Giacopelli, J. J. Hickey, W. S. Marcus, and W. D. Sincoskie, *SunShine: A High-Performance Self- Routing Broadband Packet Switch Architecture,* IEEE J. Select. Areas Commun., Vol. 9, pp. 1289–1298, October 1991.

Therefore, it would advantageous to have an improved switching system that reduces the amount of hardware required, reduces the end-to-end delay, tolerates faults, or employs inexpensive technology. Additionally, it would be advantageous to have an improved switching system that consumes less power and is scalable to handle varying amounts of total traffic.

SUMMARY OF THE INVENTION

The present invention provides an apparatus for routing a plurality of cells. The apparatus includes a plurality of inputs, wherein the plurality of cells are received at the inputs. Each of the cells contains routing information. The apparatus also includes a plurality of outputs, wherein the outputs are associated with a plurality of destinations such that each output corresponds to a destination within the plurality of destinations. The apparatus employs a routing means for routing the cells received by the inputs through the apparatus to the outputs using the routing information contained in the cells. The routing means includes a number of single path switching matrixes in which each single path switching matrix has a plurality of stages. A portion of the these stages are dilated such that two or more cells may be routed to the same destination.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION

I. Environment

Figure 1:
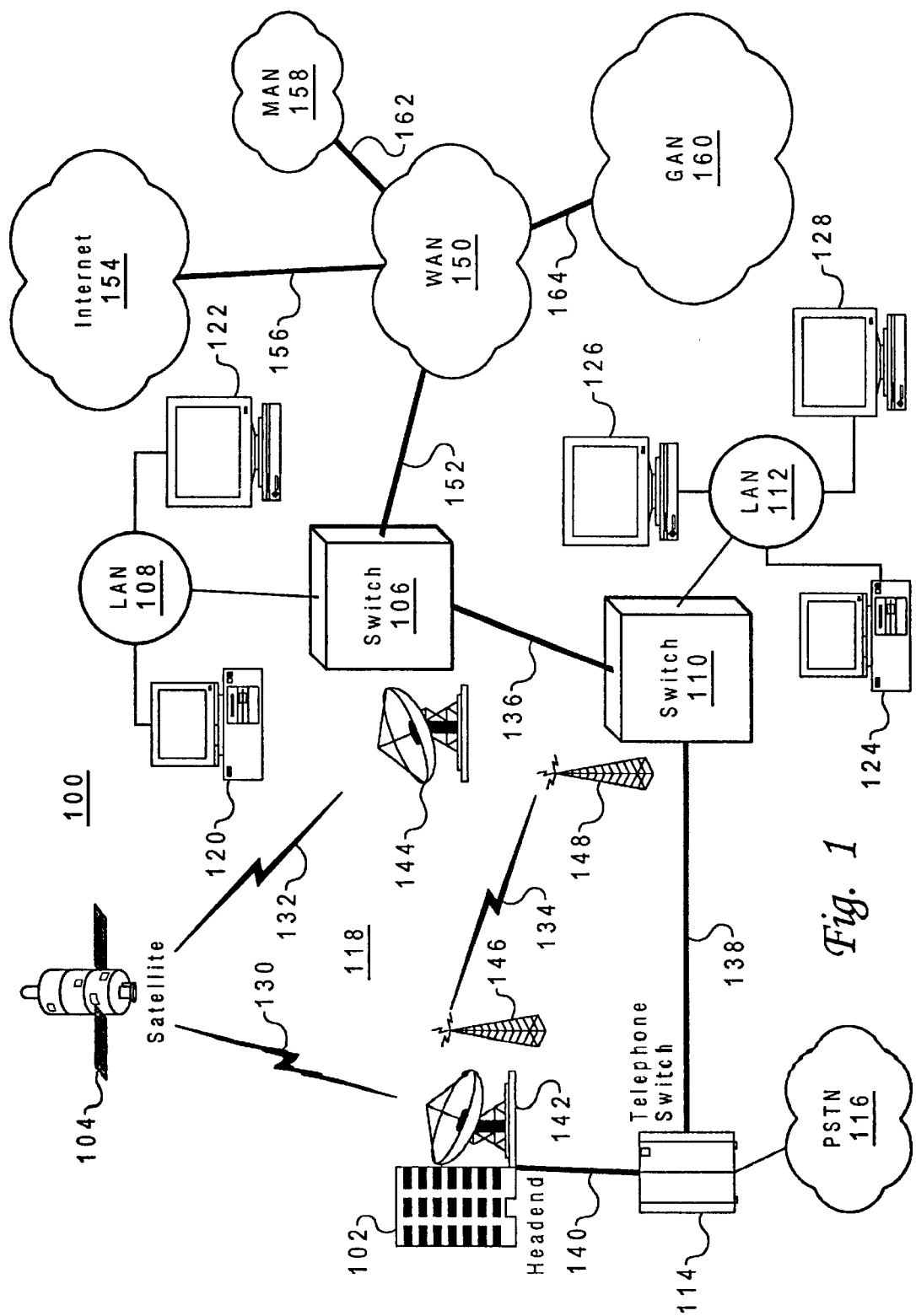
FIG. 1 depicts a diagram of a communications system according to the present invention.

With reference now to the figures, and in particular with reference to FIG. 1, a diagram of a communications system 100 is depicted according to the present invention. In particular, the present invention may be implemented in the various switches depicted in communication system 100. Headend 102; satellite switch 104; switch 106, which is a terrestrial switch connected to local area network (LAN) 108; switch 110 connected to LAN 112; and telephone switch 114 connected to public switch telephone network (PSTN) 116 form a wide area network (WAN) 118. LAN 108 includes computers, such as computers 120 and 122. LAN 112 also includes computers 124, 126, and 128. Users of these computers may send information to and from each other or to other users (not shown) within WAN 118 via communications links 130, 132, 134, 136, 138, and 140. Communications link 130 is a radio frequency based link in which the data signal is transmitted from satellite dish 142 at headend 102 to satellite switch 104. Communications link 132 is a radio frequency based link, generated by signals sent from satellite switch 104 to satellite dish 144, which is associated with switch 106. In this manner, data signals, such as multimedia data, which may include video, graphics, voice, and text, may be sent from headend 102 to a computer such as computer 120 in LAN 108. Satellite dish 144 may transmit data signals through communications link 132 to satellite switch 104 and through communications link 130 to satellite dish 142 for reception at headend 102.

Communications link 134 is a radio frequency communications link generated between radio tower 146, associated with headend 102 and radio tower 148, associated with switch 110. Switch 106, switch 110, telephone switch 114, and headend 102 are connected to each other via communications links 136, 138, and 140, which are physical links, such as, for example, coaxial cable, fiber optic cable, or a combination of the two. Each switch has a "link", also called a "path" within the switch for routing data through the switch. An "input link" is the input or source portion of the link associated with an input into the switch, and an "output link" is the output or destination portion of the link associated with an output from the switch.

Data may be sent through a number of different paths using various communications links and switching within WAN 118. For example, a user at computer 124 may send information to a user in public switched telephone network (PSTN) 116 through communications link 138. Alternatively, information may reach the user in PSTN 116 from computer 124 by sending data through a path starting with communications link 136 to communications link 132, to communications link 130, and then to communications link 140 to reach the user within PSTN 116. The various switches in WAN 118 direct traffic between other switches to facilitate flow of information within this network. Although the depicted examples show data transfers between computers, data also may be transferred between other communication devices (not shown) within communications system 100.

WAN 118 is connected to other networks, such as WAN 150 through a communications link 152 connected to switch 106. A WAN is typically designed to interconnect computer systems over large geographic scopes, such as from one city to another city within a country. Typically, a WAN may range from 100 KM to 1000 KM in the speed between the cities can range from 1.5 Mpbs to 2.4 Gpbs. Communications system 100 also includes a connection from WAN 150 to internet 154 through communications link 156. Additionally, other types of networks such as metropolitan area network (MAN) 158 and global area network (GAN) 160 through communications links 162 and 164, respectively. Metropolitan area networks typically cover a metropolitan city and interconnects a number of different LANs located in different buildings. A global area network provides connections between countries around the globe. An example of such a network is internet 154. Data is transferred to and from these various networks and to communications systems and devices within the networks using switches, such as those depicted for WAN 118. The switching system of the present invention is implemented in a satellite switch, such as satellite switch 104 according to a preferred embodiment of the present invention. The present invention also may be implemented in switches other than satellite switches.

II. General Partial-Dilated Double Destination (Pd1__DbDest) Switch Architecture Turning now to FIG. 2, a block diagram of a switch 200 is depicted according to the present invention. Switch 200 may be implemented within various switches depicted in communications system 100. In accordance with a preferred embodiment of the present invention, switch 200 is particularly suited for implementation in satellite switch 104 although switch 200 may be employed in other switches (terrestrial switches) located on the ground in communications system 100.

Switch 200 is a switch that contains partially dilated stages, also called Pd1__Dest. This switch implements an improved space-division fast packet switch architecture. In switch 200, cells that otherwise would be misrouted may still be correctly routed to the appropriate output associated with the destination for the cell through partially dilated stages.

In the depicted example, data in the form of ATM cells is received at input nodes 202, in which each input node 202 represents a "channel". Receivers (Rxs) 204 receive ATM cells from a number of these channels. Each receiver (Rx) 204 sends ATM cells to an associated serial to parallel (S/P) converter 206 with the ATM cells being sent to switch fabric 208 in a parallel form. The output of each S/P converter 206 consists of B parallel lines where B is a design parameter chosen by implementers of the switch. In what follows, a bus unit is defined to be a group of B parallel lines. In each system clock cycle, a bus unit carries B bits of an ATM cell. Switch fabric 208 includes N inputs for S/P converters 206. The ATM cells are routed and sent to parallel to serial (P/S) converters 210, which convert the parallel data representing the ATM cells into serial form for transmission by transmitters 212 to output nodes 214. Transmitters (Txs) 212 select the appropriate node 214 to transmit the ATM cells.

Figure 4:
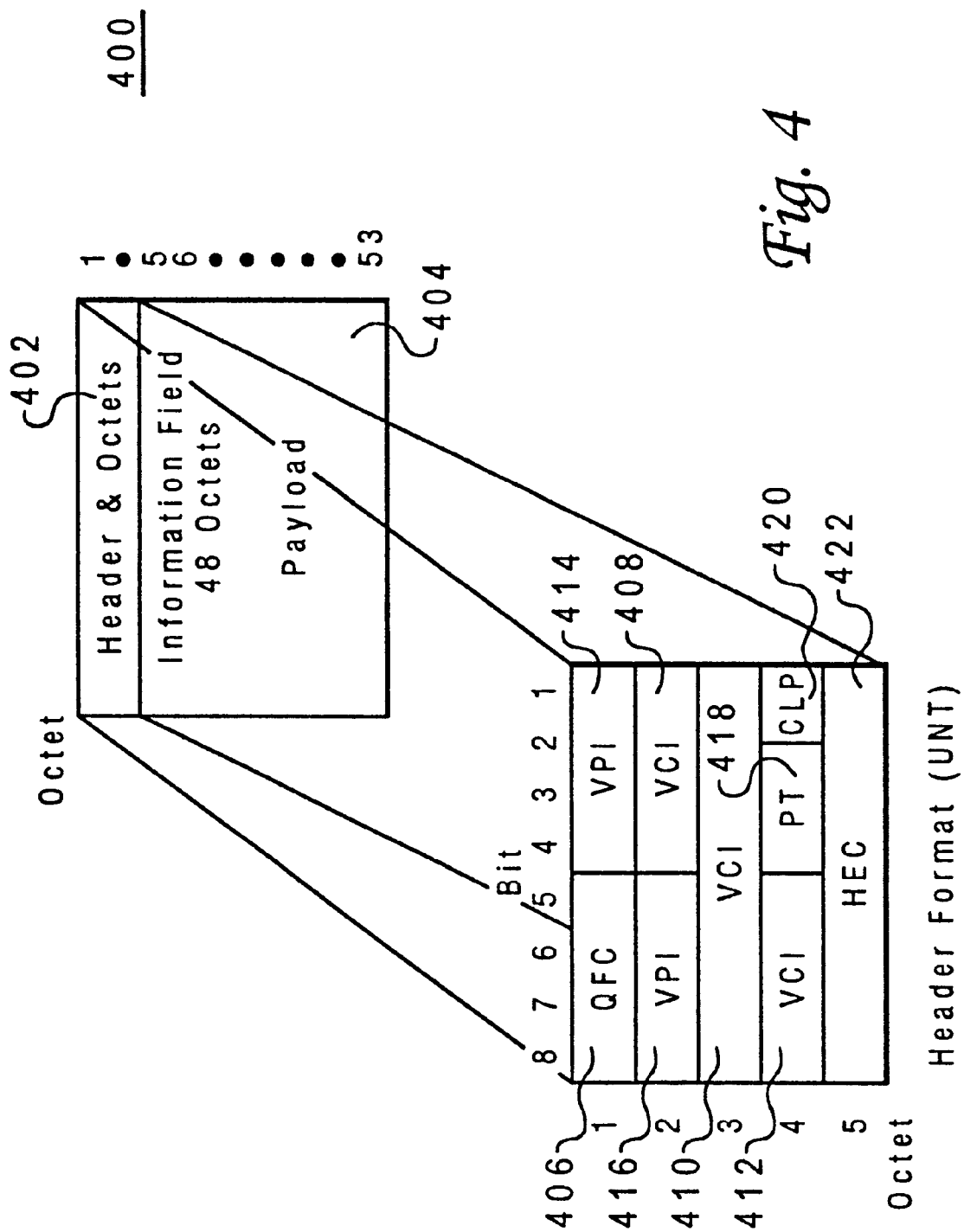
FIG. 4 is a diagram of an ATM cell that may be routed through switch fabric 208 according to the present invention.

A diagram of an ATM cell that may be routed through switch fabric 208 is illustrated in FIG. 4 in accordance with a preferred embodiment of the present invention. ATM cell 400 is a 53 byte packet having a header 402 and a payload 404 in which header 402 is a 5 byte header and payload 404 is a 48 byte payload. Header 402 includes a generic flow control (GFC) field 406, which provides contention resolution and simple flow control for shared medium-access arrangements and is present in cells located between a user and a network. ATM cells located between different switches do not contain this field. Virtual channel identifier (VCI) fields 408, 410, and 412 are employed to establish connections using translation tables at switching nodes that map an incoming VCI to an outgoing VCI. The VCI field in the header of an ATM cell is typically 16 bits. Virtual path identifier (VPI) fields 414 and 416 are used to establish a virtual path connection for one or more logically equivalent VCIs in terms of route and service characteristics. VPI fields 414 and 416 are either 8 or 12 bits depending on the location of the ATM cell.

ATM cells between switches have 12 bits for VPI while ATM cells traveling from a user to a network or switch have 8 bits. Payload type (PT) field 418 is a 3 bit field employed to differentiate cells traversing the same virtual circuit and can contain various operation, administration, and maintenance information or user information. Cell loss priority (CLP) field 420 is a 1 bit field employed to explicitly indicate cells of lower priority by setting the field to a "1". Header error control (HEC) field 422 is used to perform a cyclic redundancy check (CRC) calculation on the first 4 bytes of the header field for error detection and correction. More information on ATM cells and switching systems can be found in Geralski, *Introduction to ATM Networking*, McGraw-Hill, Inc., (1995), ISBN 0-07-024043-4.

In the depicted example, switch module 200 employs high-speed gallium arsenic (GAS) technology for external serial connections, such as the lines into serial to parallel converters 206 and the lines out of parallel to serial converters 210. Low-speed complimentary-metal-oxide-semiconductor (CMOS) technology is used for internal parallel lines inside the chip. As a result, external serial connections do not become a bottleneck and a large scale switch fabric can accomplish very high speeds.

Figure 2:
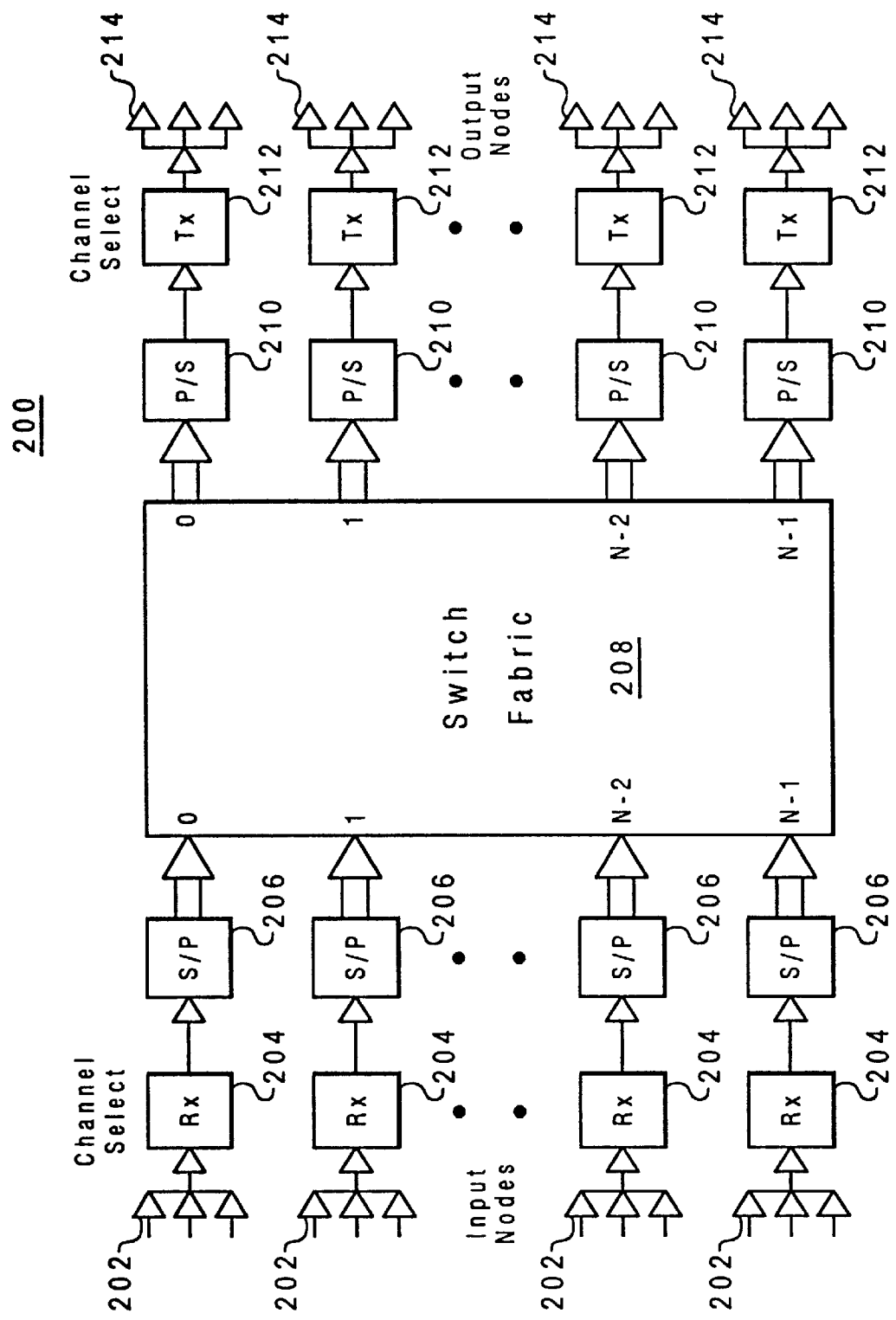
FIG. 2 is a block diagram of a switch according to the present invention.
Figure 3:
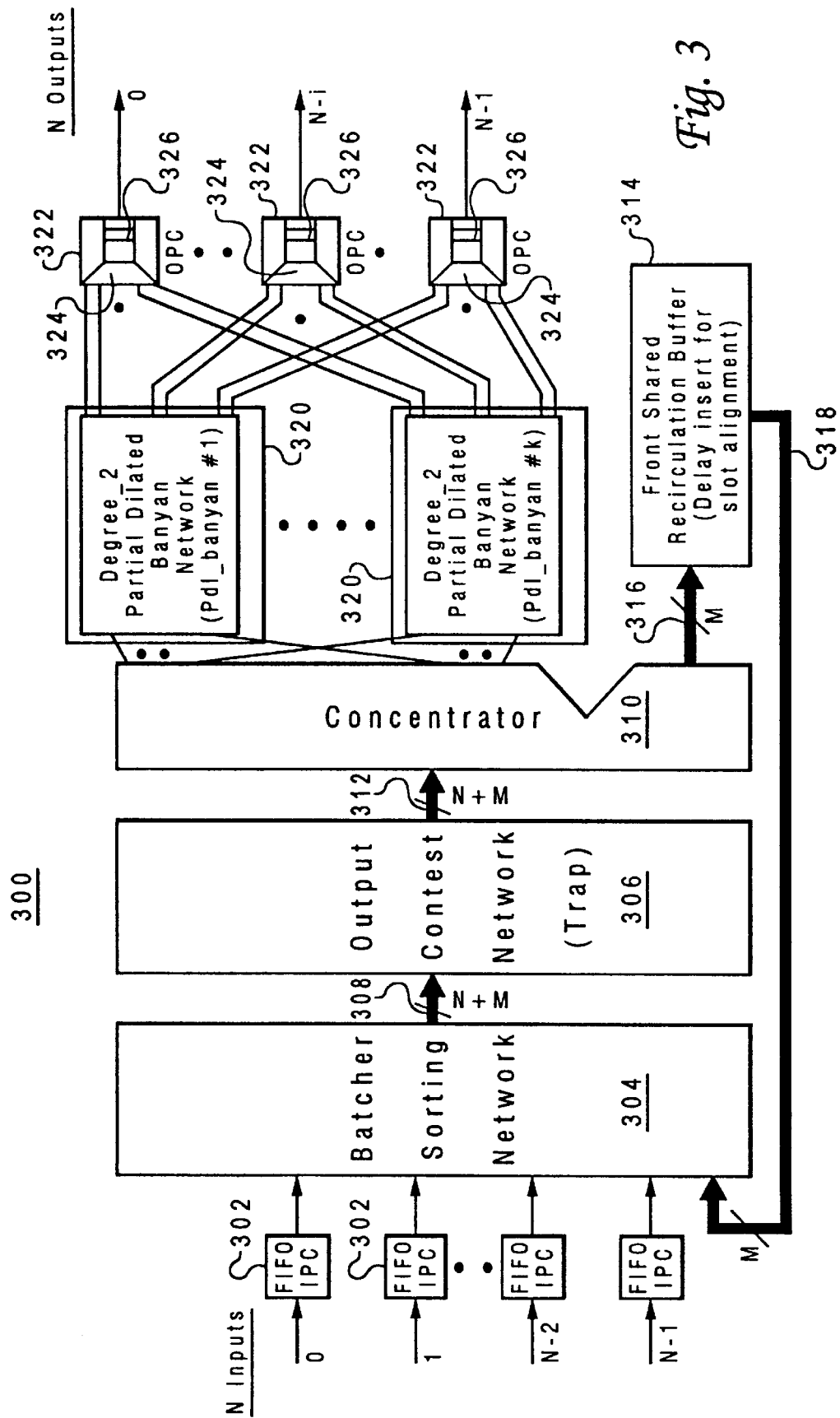
FIG. 3 depicts a block diagram of a switch fabric from FIG. 2 is depicted according to the present invention.

With reference now to FIG. 3, a block diagram of a switch unit 300 located in switch fabric 208 from FIG. 2 is depicted according to the present invention. Switch fabric 208 or switch unit 300 within switch fabric 208 may be implemented in an integrated circuit. ATM cells from serial to parallel converters 206 in FIG. 2 are received by input port controllers (IPCs) 302.

Figure 5:
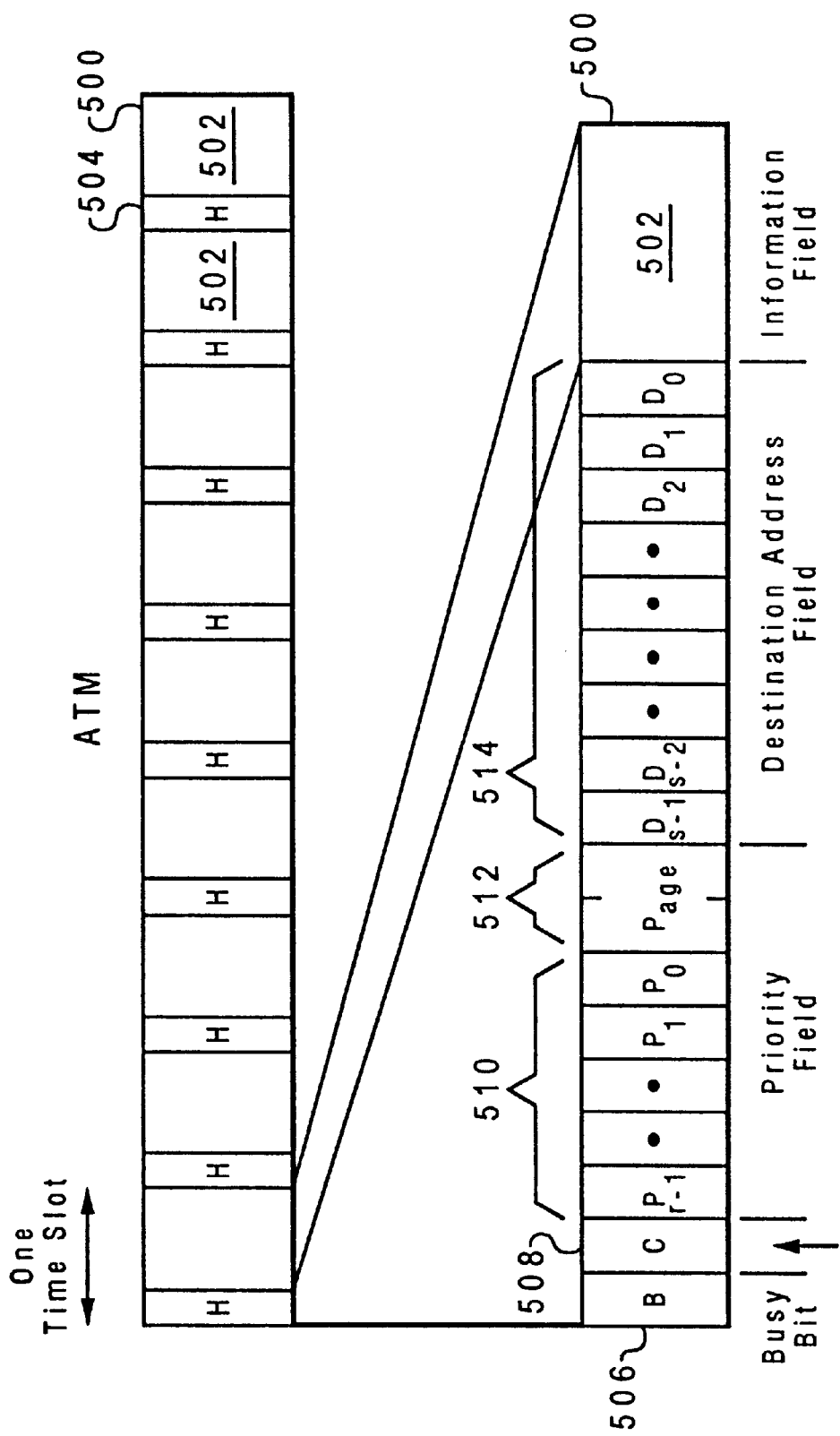
FIG. 5 depicts a diagram of cells routed within the switch fabric according to the present invention.

Referring back to FIG. 3, IPCs 302 are FIFO based IPCs, which contain FIFO queues (not shown). IPCs 302 add headers to incoming ATM cells to form cells for routing within switch fabric 208. When ATM cells arrive at IPCs 302, the ATM cells are bit synchronized with the internal clock system of switch fabric 208 and aligned with the local slot boundary. Next, the ATM cell headers are analyzed and a local switch header is generated and attached to each ATM cell as a prefix to form cells 500 as illustrated in FIG. 5. Basically, cells 500 within switch fabric 208 have an information field 502 which consists of the incoming ATM cell.

In FIG. 5, cells 500 each contain an ATM cell, such as ATM cell 400 as illustrated in FIG. 4, in information field 502. Headers 504 are added to incoming ATM cells by input port controllers 302 in FIG. 3. Each header 504 contains a number of fields for control information. Busy bit field 506 is the first field in header 504 and consists of 1 bit. Busy bit field 506 indicates whether a cell exists in information field 502. Variable B in busy bit field 506 is set equal to a "1" if a cell exists and is set equal to a "0" if no cell exists in information field 502. The second field is a conflict bit field 508, which is a 1 bit field that indicates if the cell has been misrouted or properly routed. In the depicted example, the variable C in conflict bit field 508 is set equal to a "1" if the cell has been misrouted and is set equal to a "0" if the cell has been properly routed in the depicted example. The third field is a priority field 510, which consists of $\log_2 \overline{M}$ priority bits where $\overline{M}$ is the number of priority levels. (i.e., p=<$P\log_2 \overline{M}-1, \ldots, P0.$>). The priority of a cell is determined at the initial call set up and remains unchanged for the lifetime of the cell within switch fabric 208. In the depicted example, priority field 510 includes bits $P_0$ through $P_{r-1}$, where r is the number of priority bits. The next field is an age of recirculation field ($P_{age}$) 512, which is attached to priority field 510 as a suffix to maintain the integrity of the cell sequence. The next field is a destination address field 514, which consists of $\log_2 N$ bits where N is the network size (i.e., number of outputs of the switch; D=<$D\log_2 N-1, \ldots, D0$>) to indicate the address of the output port to which the cell is destined. This address typically comes directly from the virtual circuit information in the original ATM header of the ATM cell located in information field 502. These cells 500 are routed within switch fabric 208.

From IPCs 302, cells are sent to batcher sorting network 304, where cells are sorted in order of destination address and of priority if a priority service is indicated for a cell. More information on batcher sorting networks may be found in J. Hui, *Switching Integrated Broadband Services by Sort-Banyan Networks*, Proc. IEEE, Vol. 79, pp. 145–154, February 1991, and K. Hwang, and F. A. Briggs, *Computer Architecture and Parallel Processing*, McGraw-Hill, Inc., New York, (1984), respectively. After being sorted according to their output, cells are then sent to the next stage, output contest network 306, which is also called a "trap network". Bus 308 has a width of N'=N+M bus units. N is the number of FIFO IPCs. This number is chosen by the switch designer to satisfy the provisioning of telecommunication traffic. The amount of hardware, and therefore cost, of the switch is proportional to N. M is the number of loser cells (see below) that concentrator 310 allows to re-circulate in an ATM cell time slot. M is a design parameter that the switch designer chooses to meet ATM quality of service requirements. The larger the values of M, the better the quality of service, and the larger the size of the switch.

Output contest network 306 is employed to resolve output port contentions. Concentrator network 310 separates cells to be routed ("winner" cells) from the cells to be recirculated or discarded ("loser" cells). Concentrator 310 is connected to output contest network 306 by bus 312, which has a width of N' where N'=N+M. Switch unit 300 also includes a front shared recirculation buffer 314 that is connected to concentrator 310 by bus 316, which has M bus units. Bus 318 connects front shared recirculation buffer 316 back to batcher sorting network 304 and also has a width of M bus units. Switch fabric 300 contains k networks 320 arranged in a parallel fashion. Each network 320 is a modified banyan network, also referred to as a "Pd1_banyan network". A banyan network also is called a "self-routing network" or a "single path switching matrix". Basically, banyan networks are single-path switching matrixes in which only one path exists to reach the destination from a given input. The outputs of Pd1_banyan networks 320 are connected to output port controllers (OPC) 322. Each output port controller includes a multiplexer 324 and a buffer 326. Multiplexer 324 provides for inputs from various Pd1_banyan networks while buffer 326 is employed to store cells prior to being sent out from switch 300. As can be seen in the depicted example, each Pd1_banyan network 320 has a pair of outputs for each destination associated with an output port controller 322. In the depicted example, N output port controllers 322 are present from 0 to N−1. More specifically, Pd1_banyan networks 320 are banyan networks that are partially dilated. These networks are described in more detail below in FIG. 11.

Output contest network 306 is employed to select 2 k cells for each output in switch 300 in the depicted example. The remaining cells are either recirculated through front shared recirculation buffer 314 or discarded. The 2 k selected cells are forwarded to Pd1_banyan networks 320, which forward the cells to their destinations.

III. Cell Priority and Recirculation within the Pd1_DbDest Switch

Figure 6:
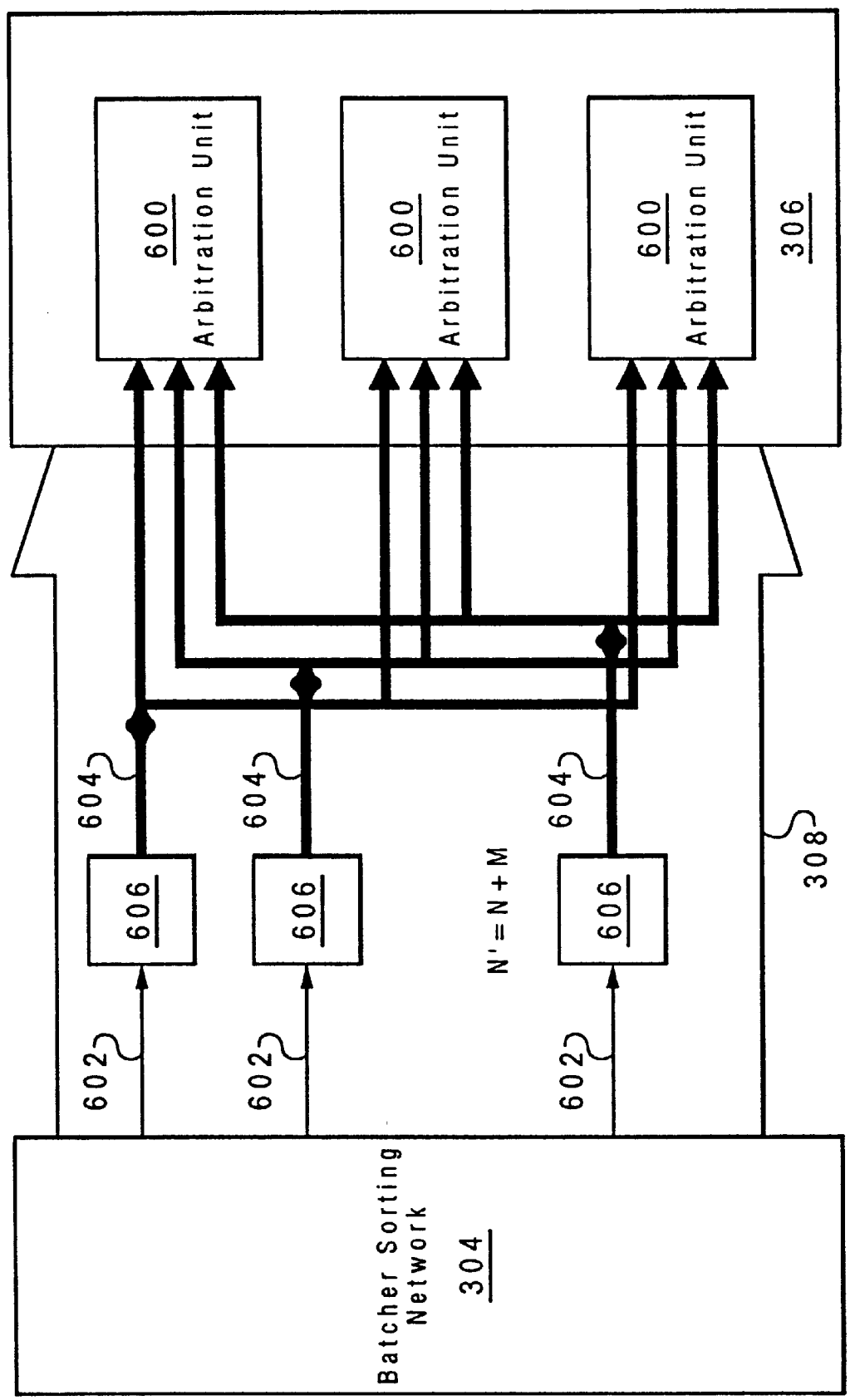
FIG. 6 is a block diagram illustrating request signals generated for cells within the switch fabric illustrated in FIG. 3 according to the present invention.
Figure 7:
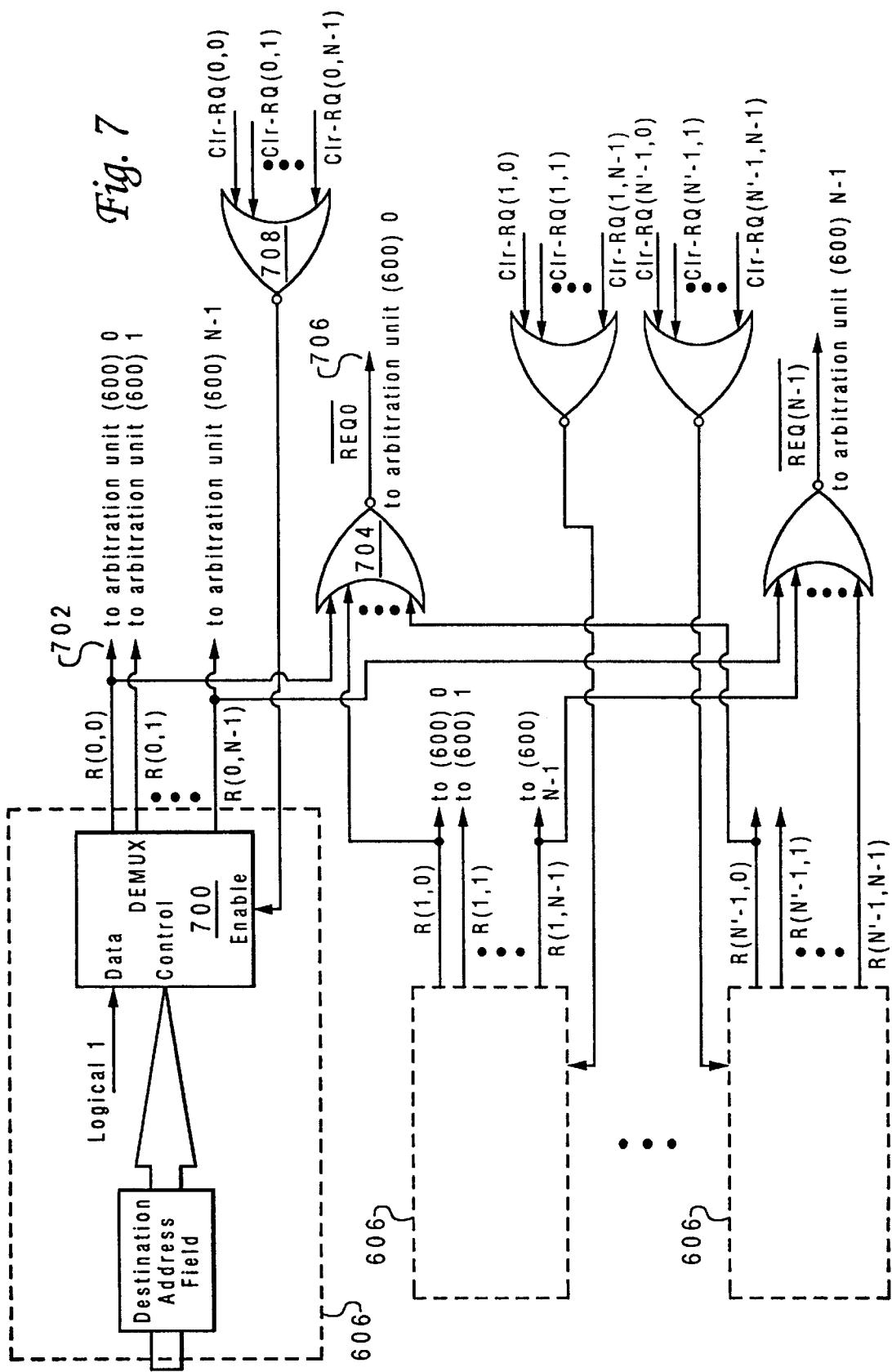
FIG. 7 depicts a data/signal unit is depicted according to the present invention.

Turning now to FIG. 6, a block diagram illustrating signals generated for cells within switch unit 300 to determine priority are depicted according to the present invention. Output contest network 306 includes a number of arbitration units 600. In the depicted example, output contest network 306 contains N arbitration units 600. Bus 308 contains data lines 602 connected to data/signal lines 604 through data/signal units 606. Each of the signal lines 604 are converted into data and control signals by data/signal units 606. A more detailed depiction of a data/signal unit 606 is shown in FIG. 7. In particular, data/signal unit 606 includes a demultiplexer 700, which receives data in the form of cells as an input from a data line 602. Although only three data/signal units 606 are illustrated in FIG. 6, N' data/signal units 606 are employed in the depicted example.

Consider data/signal unit 606 associated with data line 602 i, for each i from 0 to N'−1, demultiplexer 700 generates N R(i,j) signals 702 in which each of the signals is a zero except for the R(i,j) signal corresponding to the destination address associated with cell on line 602, where j may be from 0 to N−1. For example, if data line 602 1 has a cell with destination 7, then R(1,7) out of the N R(1) lines would be set equal to a logic "1" with the rest of the lines having a signal set equal to a logic "0". Additionally, these outputs are connected to NOR gates 704, which generate request (/Req) signals 706 to indicate that data is present on one of the lines comprising Ri lines to form signal lines 604. The output from each data/signal unit 606 is connected to all of the N arbitration units 600. The Enable in DEMUX 700 is connected to NOR gate 708, whose inputs CLR-RQ come from AND gates 804 discussed below.

Figure 8:
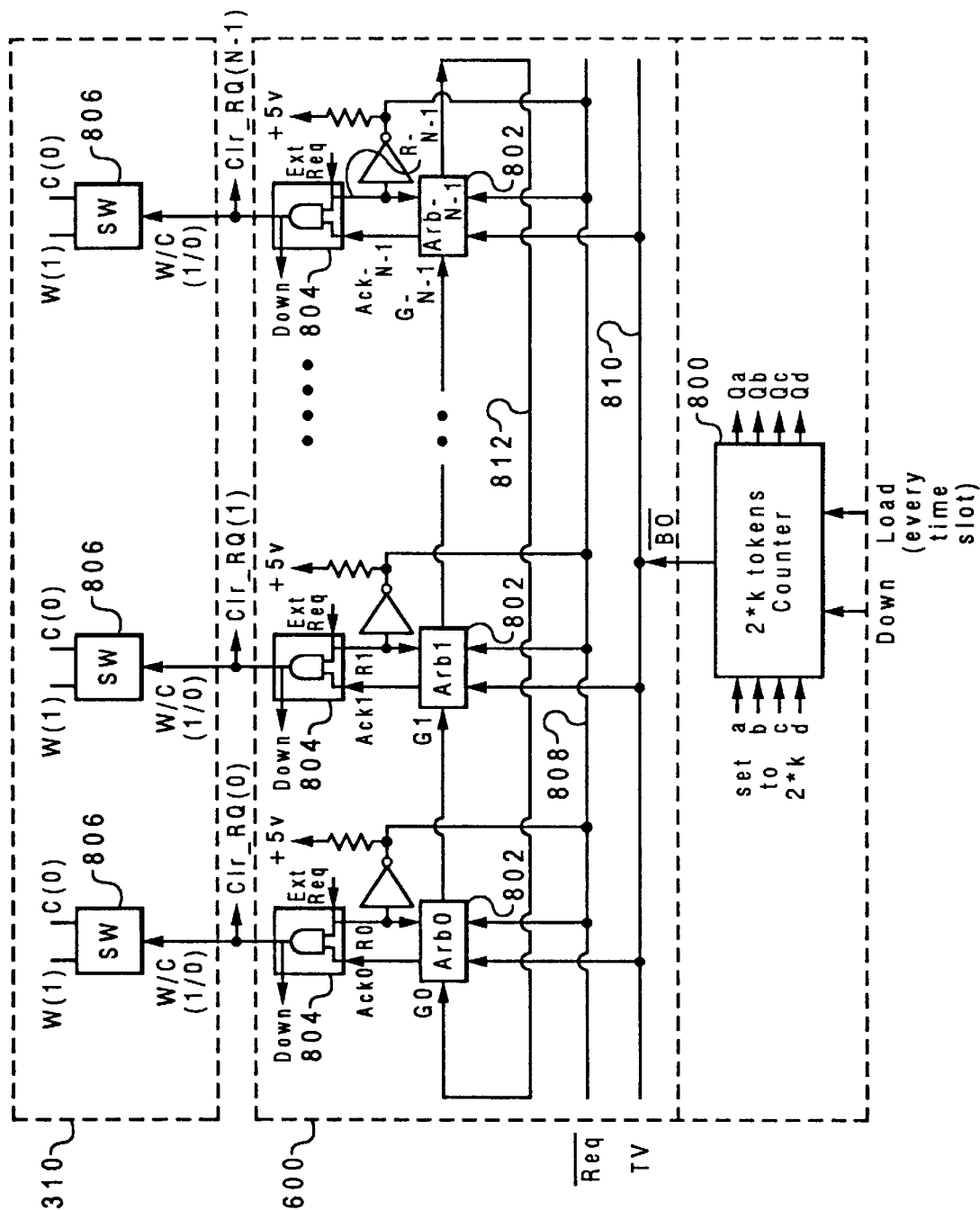
FIG. 8 is a block diagram of circuitry employed for priority determination according to the present invention.
Figure 9:
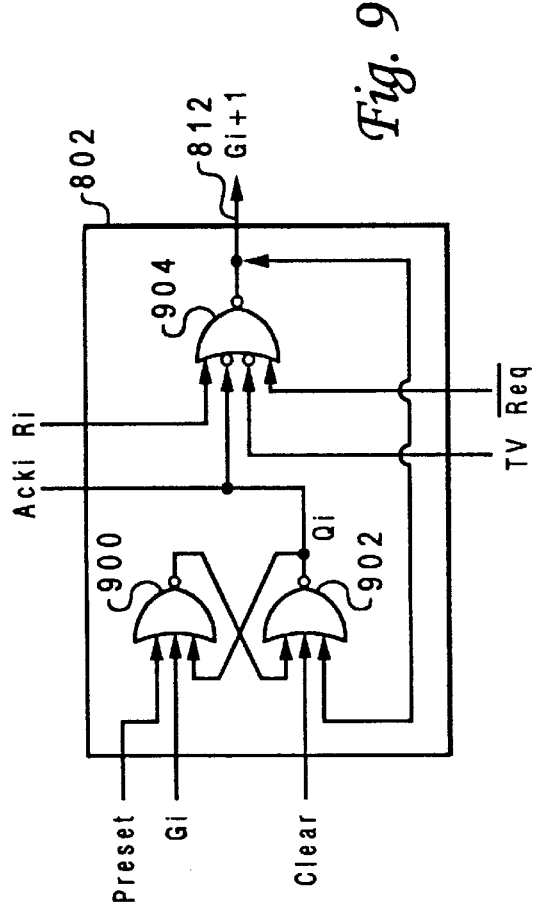
FIG. 9 depicts a logic diagram of an arbitration circuit depicted in FIG. 8 according to the present invention.

Turning now to FIG. 8, a block diagram of circuitry employed for priority determination is depicted according to the present invention. Arbitration unit 600 contains a counter 800, arbitration circuits 802, and AND gates 804. Switches 806 are located in concentration network 310. Arbitration unit 600 is employed to resolve contention caused by too many input ports (i.e., >2 k in the depicted example) requesting the same output port simultaneously. Arbitration unit 600 addresses the problem of N' users with only 2 k servers (where k<<N'). FIG. 9 is a logic diagram of an arbitration circuit 802 depicted in FIG. 8 according to the present invention. Arbitration circuit 802 includes NOR gates 900, 902, and 904.

If an external request is present, /Req line 808 is set to active, which is a low state or 0 in the depicted example. Two types of tokens are employed: recirculating tokens and counter tokens. At any given moment, at most, 2 k counter tokens are present and only one recirculating token is present. The number of counter tokens are tracked by counter 800. The recirculating token is passed between arbiter circuits 802 through circulation bus 812. If counter 800 has at least one token, then counter 800 sets TV line 810 to a high state. An arbitration circuit 802 holding the recirculation token checks TV line 810. If TV line 810 is logic "0" or at a low state, then arbitration circuit 802 continues to monitor TV line 810. If TV line 810 becomes a logic "1", is in a high state, then arbitration circuit 802 also checks request line 808 to see if an external request is present. If no external request is present, arbitration circuit 802 keeps the recirculating token and continues to monitor both request line 808 and TV line 810. When both of these lines are active, an additional check is made as to whether a request is pending at arbitration unit 802 using an input connected to signal line Ri with i=0 to N'−1 in the depicted example. If /Req line 808 is active and Ri is not active, then arbitration circuit 802 passes the recirculating token to arbitration circuit block ((i+1)modN') 900. If /Req line 808 is active and Ri is active, arbitration circuit 802 sends an acknowledgement signal $Ack_i$ to request in AND gate 804. When request i in AND gate 804 receives $Ack_i$, request i becomes a winner and causes counter 800 to count down by 1 to indicate that a counter token has been consumed. Meanwhile, request i in AND gate 804 resets Ri by sending a "1" signal on CLR-RQ line, and sends out the token-grant signal $G_{i+1}$ on circulation bus 812 which will be transferred to the next user who requests a counter token. The arbitration process continues until all 2 k tokens have been used. When a request grabs a counter token, the request is directed to the winner pool through switch 806 in concentration network 310.

Initially, when the switch is first run, an arbiter circuit is randomly chosen to hold the recirculating token. At the beginning of each time slot, TV line 810 is set to high and request line 808 is set to high. Additionally, at the beginning of each time slot, the initial 2 k value is loaded into counter 800 which is a countdown asynchronous counter. The position of the holder of the recirculating token changes randomly and dynamically as the arbitration process proceeds.

After being sorted according to the output, the cells go to output contest network 306 where output port contentions are resolved. For example, suppose that f cells are to access the same output port. Output contest network 306 chooses the 2 k cells where k is the number of networks in parallel, with the highest priority among the f cells. In the case of no or equal priority, then cells are chosen randomly. Output contest network 306 marks each of the 2 k cells as "winner cells" and marks the remaining f−2 k cells as "loser cells". Output contest network 306 also marks each loser cell as either "to be recirculated" or "to be discarded". If a priority cell is used, then the M loser cells with the highest priority are marked to be "to be recirculated" and all other cells are marked to be discarded. If no priority is used or in the case of ties, the M cells are chosen randomly.

Figure 10:
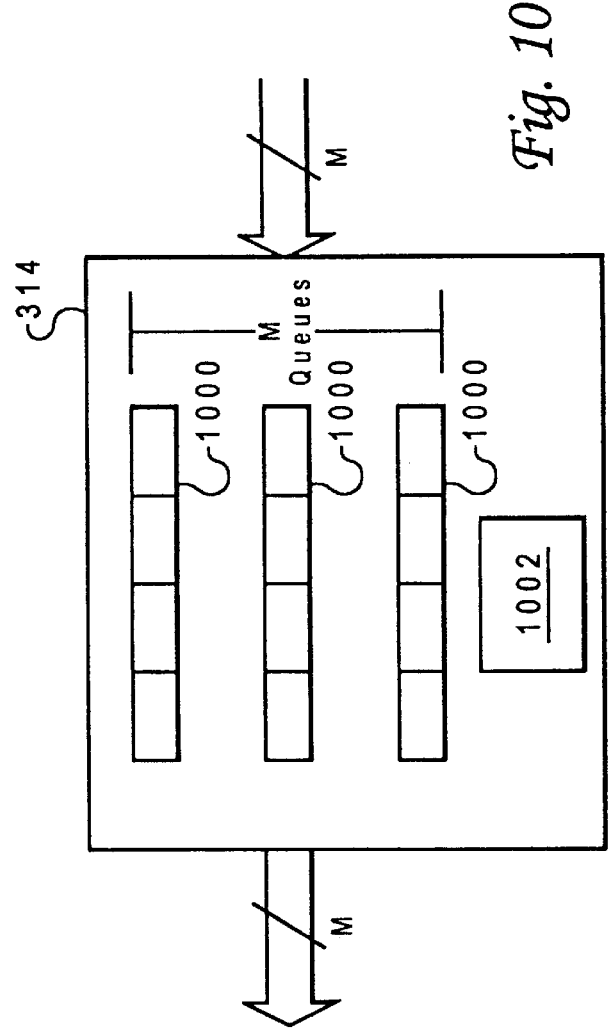
FIG. 10 is a block diagram of a front shared recirculation buffer according to the present invention.

Concentrator network 310 separates cells to be routed from cells to be recirculated or discarded and distributes the cells to networks 320, front shared recirculation buffer 314, or into a discard (not shown). The cells marked to be recirculated are fed back into the fabric through front shared recirculation buffer 314 which includes queues 1000 as shown in FIG. 10. A total of M queues 1000 is contained within front shared recirculation buffer 314. Cells are stored here and sent back to batcher sorter network 304 at each slot by slot boundary alignment unit 1002. Head-of-line (HOL) blocking exists in FIFO queues in input port controllers 302. HOL blocking can reduce the throughput of switch fabrics because once the front head cell in an input queue loses the contention for an output port, the cell will remain in the input queue and wait for a retry in the next time slot. Thus, the cell blocks other cells in the queue from being served even though their destination outputs may be idled. According to the present invention, HOL effects is avoided by employing a common shared recirculation queue, front shared recirculation buffer 314. Upon arrival cells are injected into the head of the FIFO queues in input port controllers 302. Cells that lose the contention for output ports remain in the switch fabric and go through a delay circuit, front shared recirculation buffer 314, to be recirculated back to dedicated input port and batcher sorting network 304. Front shared recirculation buffer 314 also synchronizes the cells with those arriving in the next time slot. Not all of the losing cells can be recirculated because of the expense of additional hardware cost and because recirculation may cause traffic congestion in subsequent time slots. On the other hand, to prevent massive cell loss, the size of the shared recirculation queue, front shared recirculation buffer 314 cannot be very small. Thus, a balance between shared recirculation queue size and cell loss must be made.

IV. Partially Dilated Double Destination Switching

Figure 11:
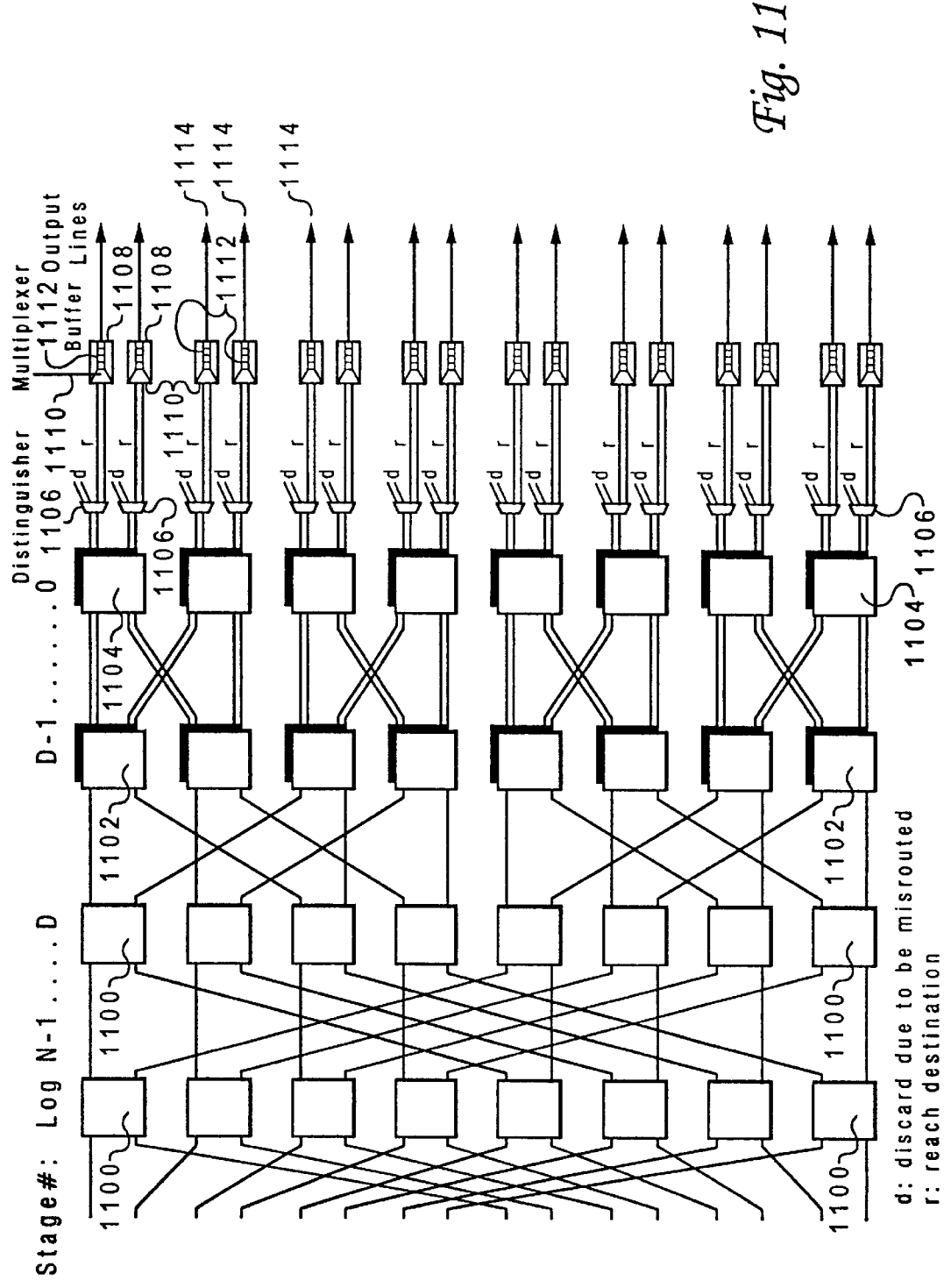
FIG. 11 depicts a block diagram of a network from FIG. 3 with output port controllers according to the present invention.

Turning now to FIG. 11, a block diagram of a network 320 from FIG. 3 is depicted with output port controllers according to the present invention, network 320. As can be seen, Pd1_banyan network 320, also called a single path switching matrix, includes switching elements 1100, 1102, and 1104. In the depicted example, four stages of switches, two stages including switches 1100 and two stages including switches 1102 and 1104, are illustrated. Although only four stages are illustrated in FIG. 11, other number of stages may be employed depending on the switch design. Switch 300 employs k N×N Pd1_banyan networks in parallel in the depicted example. N×N Pd1_banyan networks can route a set of sorted input cells to their destinations without internal blocking if no output port contention occurs. According to the present invention, switch 300 is modified to such that each Pd1_banyan network 320 is allowed to route up to two cells to each destination in the depicted example. Modified links and switch elements are employed in the D stages (labeled 0 to D−1) as illustrated in FIG. 11. The D stages closer to the output ports become dilated by a degree of 2, where D is a design parameter depending on the switch in traffic. The last D stages are selected for dilation in the depicted example because most internal conflict in routing cells occurs at the last stages. These dilated stages employ switches 1102 and 1104. At the last stage, each switching element 1104 has two pairs of outputs with each pair of outputs being connected to a distinguisher 1106. As a result, each output link routes two cells to a distinguisher 1106. When the destination of a cell matches the physical address of the output link to the output port controller, the cells are delivered to the destination buffer in output port controller 1108. Misrouted cells are discarded by distinguisher 1106. Each output port controller 1108 includes a multiplexer 1110 and a buffer 1112 with the buffer being attached to output lines 1114. When a destination of a cell matches the physical address of the output link, that cell is delivered to a buffer 1112 in output port controller 1108 through a statistical 2:1 multiplexer 1110, which is employed because it is a degree-two-dilated system in which two packets might be correctly routed to the output port. Although the depicted example employs dilated stages that are degree-two-dilated, other degrees of dilation may be employed according to the present invention.

Figure 12A:
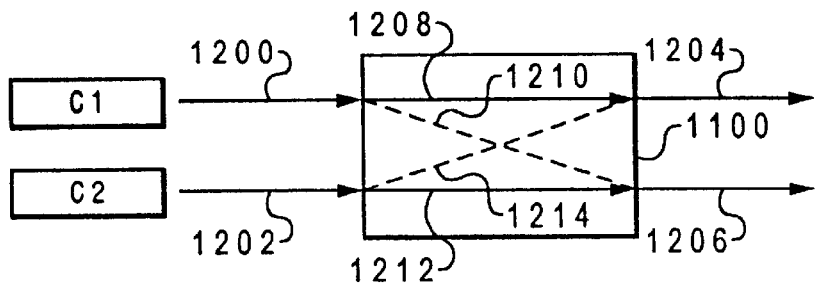
FIGS. 12A–12C are block diagrams of switching elements within a network from FIG. 3 according to the present invention.
Figure 12B:
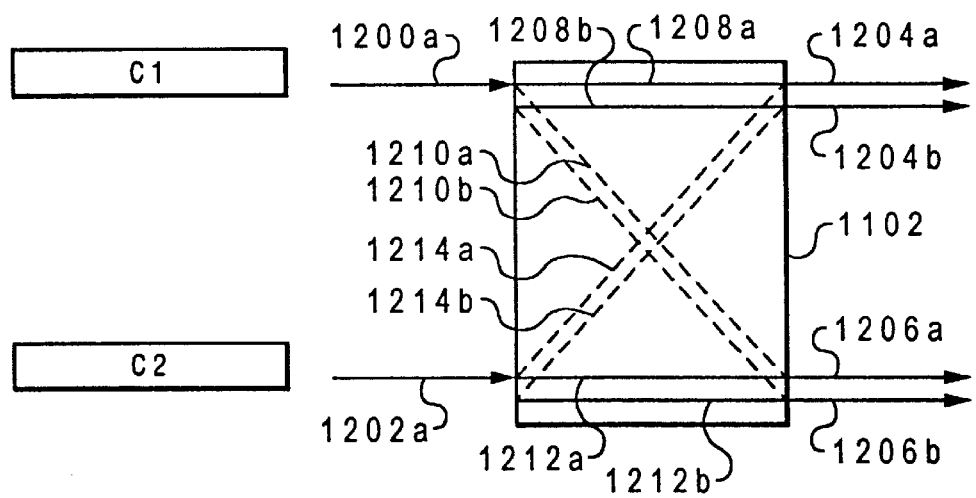
Figure 12C:
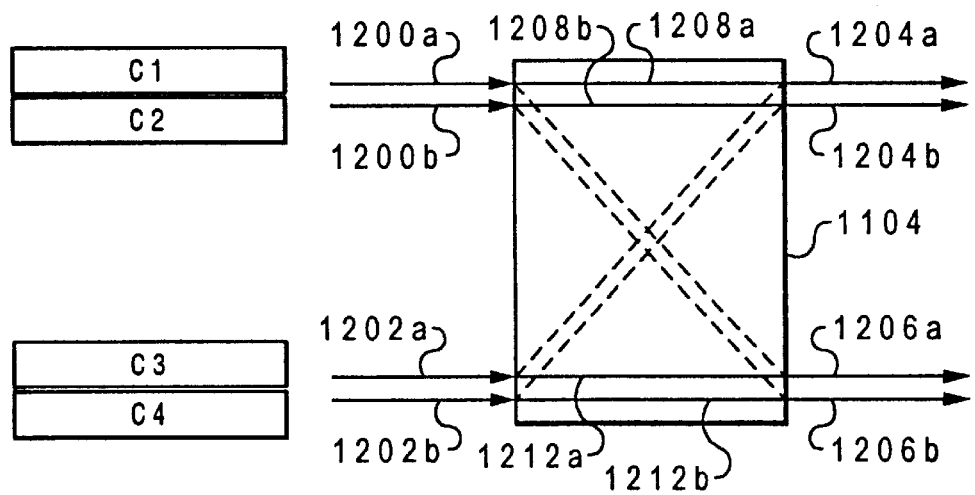

FIG. 12A shows a block diagram of a switching element 1100 from FIG. 11 according to the present invention. As can be seen, switching element 1100 includes input lines 1200 and 1202 with output lines 1204 and 1206. A cell C1 on input line 1200 may follow either path 1208 or 1210. Path 1208 results in cell C1 exiting at output 1204 while path 1210 results in cell C1 exiting switching element 1200 at output 1206. A cell entering switching element 1200 at input 1202 may take path 1212, which results in cell C2 exiting switching element 1200 at output 1206. Path 1214 would result in cell C2 exiting switching element 1200 at output 1204. Turning to FIG. 12B, a block diagram of a switching element 1102 from FIG. 11 is depicted according to the present invention. Switching element 1102 includes input lines 1200a and 1202a. Switching element 1102, however, contains four output lines 1204a, 1204b, 1206a, and 1206b. Output lines 1204a and 1204b are output lines for a single destination. Similarly, output lines 1206a and 1206b are both used to route cells to a single destination. Thus, two cells may be routed to each destination. Cells arriving at input lines 1200a and 1202a may be routed to any of the four output lines 1204a, 1204b, 1206a, and 1206b according to the present invention. This is accomplished through various paths within switching element 1102. For example, a cell C1 at input 1200a may be routed to output line 1204a through path 1208a or to output line 1204b through path 1208b. Cell C1 may be routed to output line 1206a through path 1210a or to output line 1206b through path 1210b. Similarly, cell C2 may be routed to outputs 1204a, 1204b, 1206a, and 1206b through paths 1214a, 1214b, 1212a, and 1212b, respectively. In FIG. 12C, a block diagram of a switching element 1104 is depicted according to the present invention. Switching element 1104 is similar to switching element 1102 in FIG. 12B except that switching element 1104 includes four input lines 1200a, 1200b, 1202a, and 1202b from which a cell, such as cells C1–C4, arriving at one of these input lines may be routed to any of the four output lines 1204a, 1204b, 1206a, or 1206b through the paths located within switching element 1104. Switch 1102 in FIG. 12B and switch 1104 in FIG. 12C both allow for two cells to be routed to a destination. Switching element 1102 is used in stage D−1 in FIG. 11, while switching element 1104 is used in stages 0 through D−2.

If no priority service is requested, the setting of each switch element at any stage i in a Pd1_banyan network is a function of four parameters, the busy bit(B), the conflict bit(C), the age of recirculation ($P_{age}$), and the ith bit of the destination address ($D_i$). On the other hand, if priority service is in effect, then the setting of each switch element is also a function of the priority field (P). Thus, a smart routing algorithm based on the Pd1_DbDest header of each cell is used in switch 200 in accordance with a preferred embodiment of the present invention and is described as follows. Suppose that two cells, cell a and cell b, appear at the inputs of a 2×2 switch element at stage i.

1. If $B_a=B_b=1$, then
  1.1 If $C_a=C_b=0$ then
    1.1.1 If $P_a=P_b$ or no priority at all, then the switch is set according to either $D_{ia}=D_{ib}$ randomly.
    1.1.2 If $P_a>P_b$, then the switch setting follows $D_{ia}$.
    1.1.3 If $P_a<P_b$, then the switch setting follows $D_{ib}$.
If i is a dilated stage, the loser can use the output port of the dilated switch element to avoid misrouting only when no packet with zero conflict bit in dilated switch is destined to the same output port.

If one of the cells has been misrouted in 1.1.1, 1.1.2 or 1.1.3, then set its conflict bit to 1.
  91.2 If $C_a=0$ and $C_b=1$, then switch setting follows $D_{ia}$.
  1.3 If $C_a=1$ and $C_b=0$, then switch setting follows $D_{ib}$.
  1.4 If $C_a=C_b=1$, then switch setting follows $D_{ia}$ or $D_{ib}$ randomly.

2. If $B_a=1$ and $B_b=0$, then switch setting follows $D_{ia}$.
3. If $B_a=0$ and $B_b=1$, then switch setting follows $D_{ib}$.
4. If $B_a=B_b=0$, then no setting is required.

Figure 13:
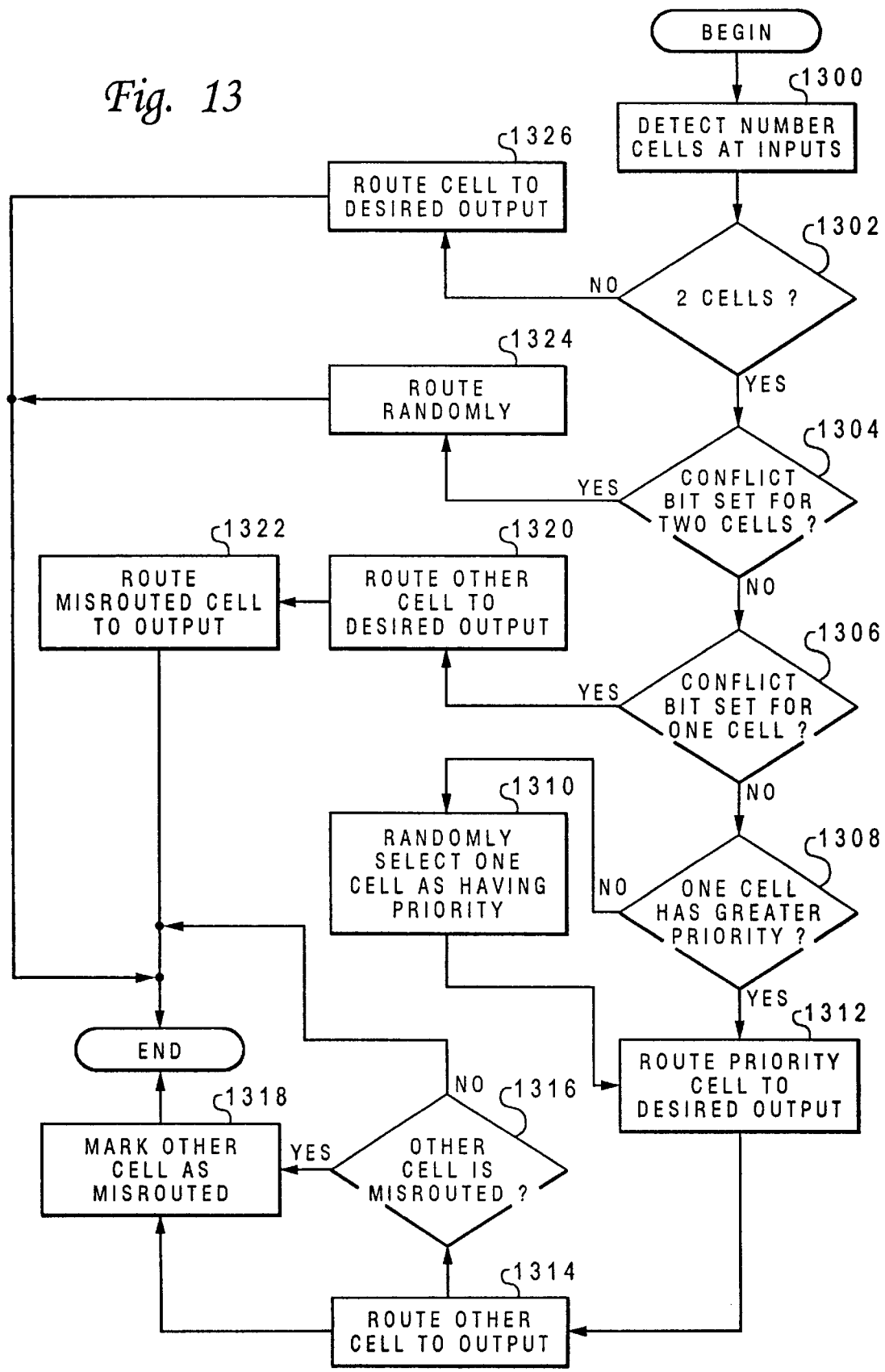
FIG. 13 is a flowchart of a process employed in routing cells within a switching element according to the present invention.

With reference now to FIG. 13, a flowchart of a process implementing priority service in a switching element 1100 is depicted according to the present invention. The process begins by detecting the number of cells present at the inputs (step 1300). A determination is then made as to whether two cells are located on the input lines (step 1302). If two cells are present on the input lines, then a determination is made as to whether a conflict bit has been set for both cells (step 1304). As described above, a conflict bit indicates whether a cell has been misrouted. A cell has been misrouted when the conflict bit is set equal to one. If the conflict bit has not been set for both cells, then a determination is made as to whether a conflict bit has been set for one of the two cells (step 1306). If a conflict bit has not been set for either cell, then a determination is made as to whether one cell has greater priority over the other cell (step 1308). If neither cell has greater priority over the other cell, then one cell is randomly selected as having greater priority (step 1310). Thereafter, the cell with priority is routed to the desired output (step 1312).

With reference again to step 1308, if one cell has greater priority over the other, the process then proceeds directly to step 1312. Next, the other cell, with less priority is then routed to the other output (step 1314). A determination is then made as to whether the cell without priority is misrouted (step 1316). If the cell is misrouted, it is marked as misrouted (step 1318) with the process terminating thereafter. The process also terminates if the cell is not misrouted.

With reference again to step 1306, if the conflict bit has been set for one of the two cells, the cell in which the conflict bit is not set is routed to the desired output (step 1320). The other cell, the cell with the conflict bit set, is routed to the other output (step 1322) with the process terminating thereafter. With reference again to step 1304, if the conflict bit is set for both cells, then the cells are both routed randomly to the two outputs (step 1324) with the process terminating thereafter.

With reference again to step 1302, if only one cell is present at the input, then that cell is routed to the desired output (step 1326) with the process terminating thereafter.

Figure 14:
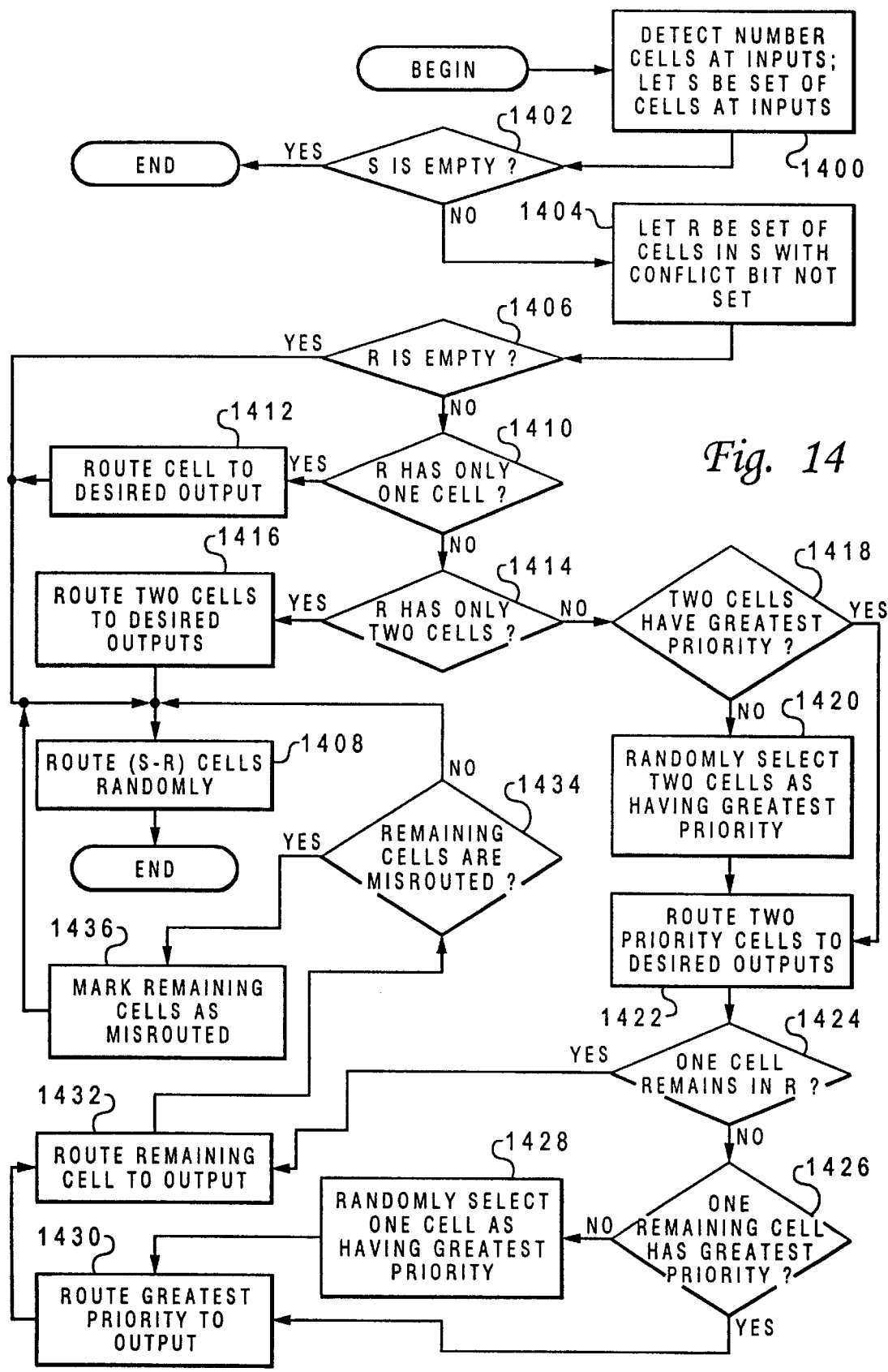
FIG. 14 is a flowchart of a process employed in routing cells within a switching element in a dilated stage according to the present invention.

With reference now to FIG. 14, a flowchart of a process for routing cells within a switching element in the dilated stages 1102 and 1104 is depicted according to the present invention. The process begins by detecting a number of cells at the inputs and letting S be a set of cells equal to the number of cells at the inputs (step 1400). The process then determines whether S is empty (step 1402). If S is empty, the process terminates. Otherwise, the process then lets R be equal to a set of cells within S with an unset conflict bit (step 1404). Thereafter, a determination is made as to whether R is empty (step 1406). If R is empty, that means that all of the cells have conflict bits set and the process then routes S-R cells randomly to the outputs (step 1408) with the process terminating thereafter. If some cells do not have conflict bits set (R is not empty), the process then determines whether R has only one cell (step 1410). If R is equal to one, indicating that only one cell is present in R, the process then routes that cell to the desired output (step 1412) with the process then proceeding to step 1408 as described above. If R does not have only one cell, the process then determines whether R has only two cells (step 1414). If R only has two cells, the cells are routed to the desired output (step 1416) with the process proceeding to step 1408 as previously described.

With reference again to step 1414, if R has more than two cells, the process then determines whether two of the cells within R have the greatest priority (step 1418). In other words, a determination is made as to whether two cells have a greater priority than the rest of the cells in the set R. If two cells do not have the greatest priority, the process then randomly selects two cells as having the greatest priority (step 1420). Thereafter, the two cells with the greatest priority are routed to the desired outputs (step 1422). The process also proceeds directly to step 1422 from step 1418 if a determination is made that two cells in the set R do have a higher priority than the rest of the cells.

After routing the cells with the highest priority to the desired outputs, the process then determines whether one cell remains in the set R (step 1424). If one cell does not remain in R, then two cells remain in R, and a determination is then made as to whether one of the remaining two cells has the greatest priority (step 1426). If a remaining cell does not have the greatest priority, the process then randomly selects one cell as having the greatest priority (step 1428). Thereafter, the cell with the greatest priority is routed to an unused output (step 1430). The process also proceeds directly to step 1430 from step 1426 if the one remaining cell has the greatest priority. The process then routes the remaining cell to the desired output (step 1432). The process also proceeds to step 1432 from step 1424 if a determination is made that only one cell remains in the set R. Thereafter, a determination is made as to whether the remaining cells are misrouted. If the remaining cells are not misrouted, then the S-R cells are randomly routed to various outputs (step 1408). If the remaining cells are misrouted, the process then marks the remaining cells as misrouted (step 1436) with the process proceeding to step 1408 as previously described.

V. Linked Outputs in DbDest Switch

A link group serving a high bandwidth pipe can resolve the overflooding of the recirculation queue. Grouping links of outputs has many advantages over traditional unilink routing. Bursty traffic can be soothed by multiplexing several bursty calls onto a trunk group to achieve high bandwidth utilization. Additionally, high bit-rate services, such as interoffice communication networks can be supported. Additionally, trunk group usage needs to be monitored instead of observing each individual link. As a result, costs can be reduced. Moreover, throughput can be increased in input queuing switches.

Figure 15:
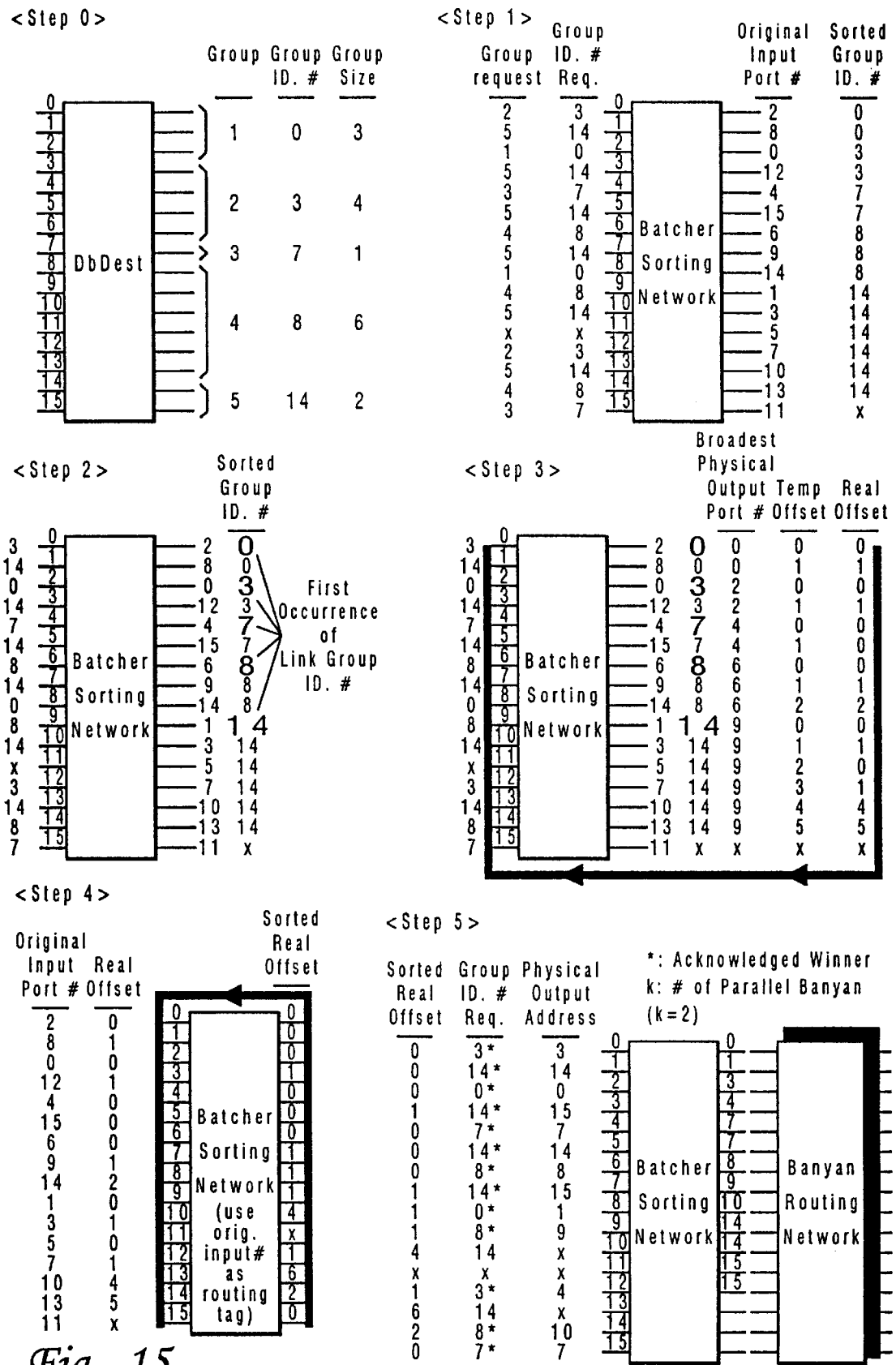
FIG. 15 is a diagram illustrating steps in a multilink access algorithm according to the present invention.

With reference now to FIG. 15, a diagram illustrating steps in a multilink access algorithm is depicted according to the present invention. The process is executed in every time slot during the operation of switch fabric 300. Before the process begins, the physical output port numbers are separated into groups as selected by the user or designer. A link group is identified by the smallest physical output port number contained within it. All members in a link group have consecutive physical output port numbers. A link group size $S_{gi}$ will be associated with link group i. This can be seen in step 0 in FIG. 15.

Each cell that comes out from an input port controller 302 with some destination output link group g will have a bit "0" attached as a prefix to the binary representation of g. If the cell has no destination, then the cell will have a prefix of "1". Then, the cells retain their input port numbers and are routed through batcher sorting network 304 by using the prefix bit and the link group number as the routing tag. The output of batcher sorter network 304 is a sequence of cells sorted by their link group numbers on the top followed by those cells that have no destinations at the bottom because the latter have larger routing values. Thus, cells with common link group numbers become adjacent. Moreover, the cells with the same link group number are sorted arbitrarily. If priority service is used, then cells in the same link group number can be sorted by appending priority bits at the end of each link group number. Step 1 in FIG. 15 illustrates the output of batcher sorter network 304 where the output is a sequence of sorted link group numbers followed by cells with no destinations. The cells with no destinations are marked with a "X" in the sorted group ID column in step 1 of FIG. 15.

In step 2 in FIG. 15, starting from output 0 of batcher sorter network 304, for each group ID i, switch fabric 300 locates the first cell in i. The locating of the first cell can be done by requiring each output q to send downstream the link group number of the cell at q through a dedicated bus.

Figure 16:
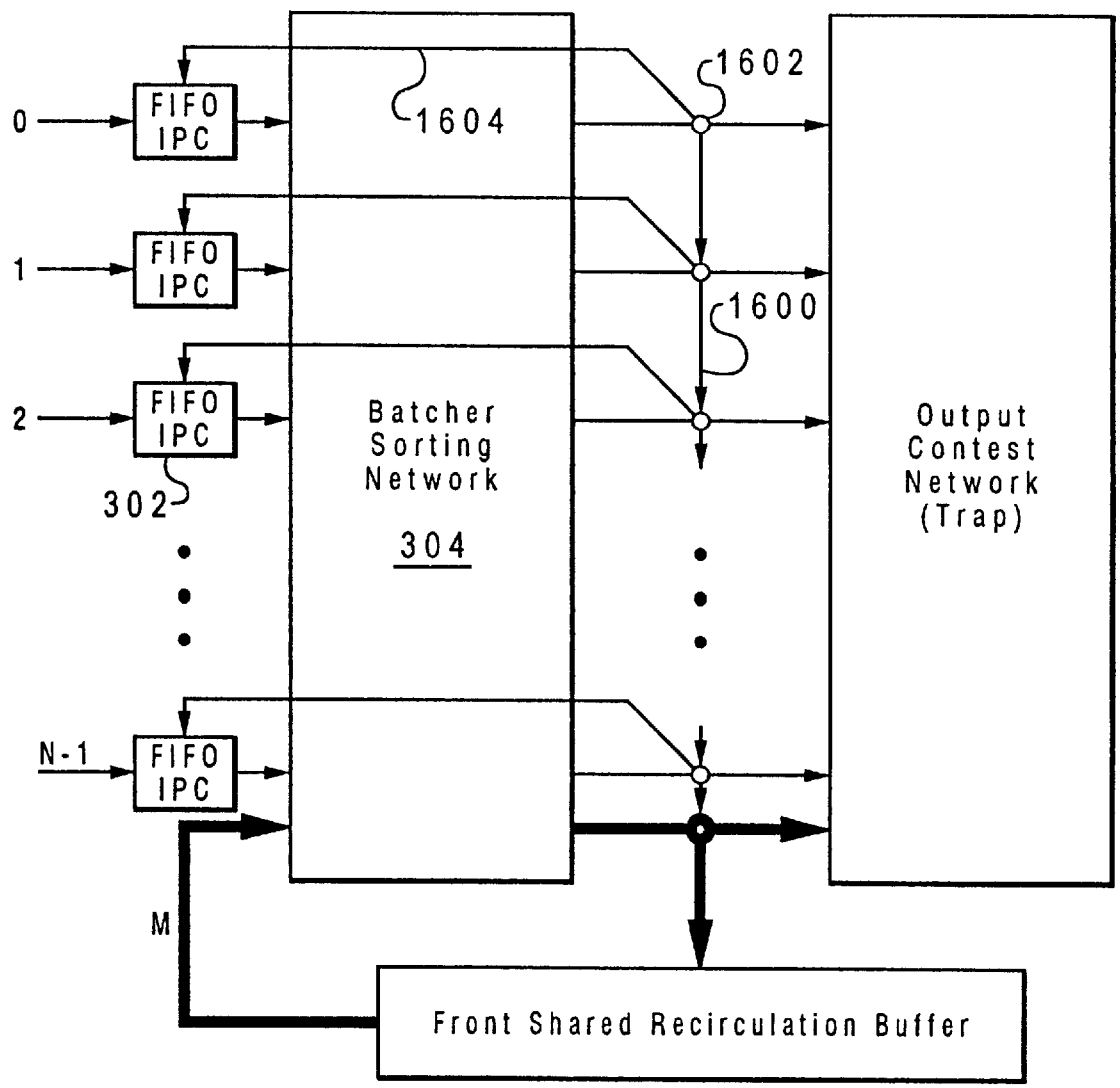
FIG. 16 is a block diagram of a portion of the switch depicted in FIG. 3 identifying data flow according to the present invention.

With reference to FIG. 16, a block diagram of a portion of switch 300 from FIG. 3 in which data flow is depicted according to the present invention. Bus 1600 is the dedicated bus through which each output q from batcher sorting network 304 is sent. Each output q compares the sent group number with the received group number. Those outputs where the link group numbers do not match can be identified. With reference again to step 2 in FIG. 15, the first occurrence of each link group number is identified and marked with a capital font as illustrated in step 2 of FIG. 15 at the output of batcher sorter network 304.

With reference to step 3 in FIG. 15, each identified output port q at the first occurrence of each link group number broadcasts q's physical port number downstream to all members in q's family (i.e., ports with the same output link group number). Temporary offsets are computed for the cells within each link group number by subtracting the received broadcast number from the physical output port number at each output port. Bus 1600 contains a series of switches 1602, and the subtractions are performed in the switches 1602. Also, switches 1602 compute the real offsets for cells C in link group I as follows:

If the temporary offset $Of_{ctemp}$ of C is smaller than or equal to $S_{gi}*K$ (where $S_{gi}$ is the group size of link group I and K is the number of parallel banyan networks), then the real offset $Of_{creal}$ of C will be the remainder of the temporary offset divided by $S_{gi}$ (i.e., $Of_{creal}=Of_{ttemp}$ MOD $S_{gi}$).

Otherwise, the real offset of C is equal to the temporary offset of C.

As can be seen with reference still to step 3 in FIG. 15, six requests are present for link group number 14 with K=2. The real offsets of request 1 through 4 are computed by $Of_{itemp}$ MOD 2 because their temporary offsets are smaller or equal to $S_{gi}*K=2*2$. The real offsets of requests 5 and 6 are equal to their temporary offsets. The cells and their real offsets are then fed back to input port controllers 302 associated with batcher sorter network 304 through lines 1604 as depicted in FIG. 16.

With reference next to step 4 in FIG. 15, batcher sorter network 304 sorts the cells with real feedback offsets by using the retained input port numbers as routing tags. The cells now become sorted in their original input sequence. Then, the cells at output ports of batcher sorter network 304 are fed back to input port controllers 302.

Referring next to step 5 in FIG. 15, the process for identifying winners and losers between cells is illustrated. For every input port p that receives a feedback offset, c(p) is the cell at p. If the feedback real offset of c(p) is smaller than the link group size of the destination of c(p), then c(p) is labeled a "winner" else c(p) is labeled a "loser". Then the real offset of c(p) and the request output link group ID of c(p) are added together to form the physical output port address for c(p). Next, all cells are then sent through to concentrator network 310. Concentrator network 310 sends all winner cells to networks 320 as illustrated in FIG. 3.

Loser cells are either discarded or sent to front shared recirculation buffer 314 through bus 316 and finally return to batcher sorting network 304 through bus 318. With reference again to step 5 in FIG. 15, cells at input ports 1, 3, 5, and 7 are marked "winner" for access to link group number 14. Each of their physical output port addresses is the sum of the real offset and the link group ID. On the other hand, cells at inputs 10 and 13 are marked with the label "loser".

Figure 17:
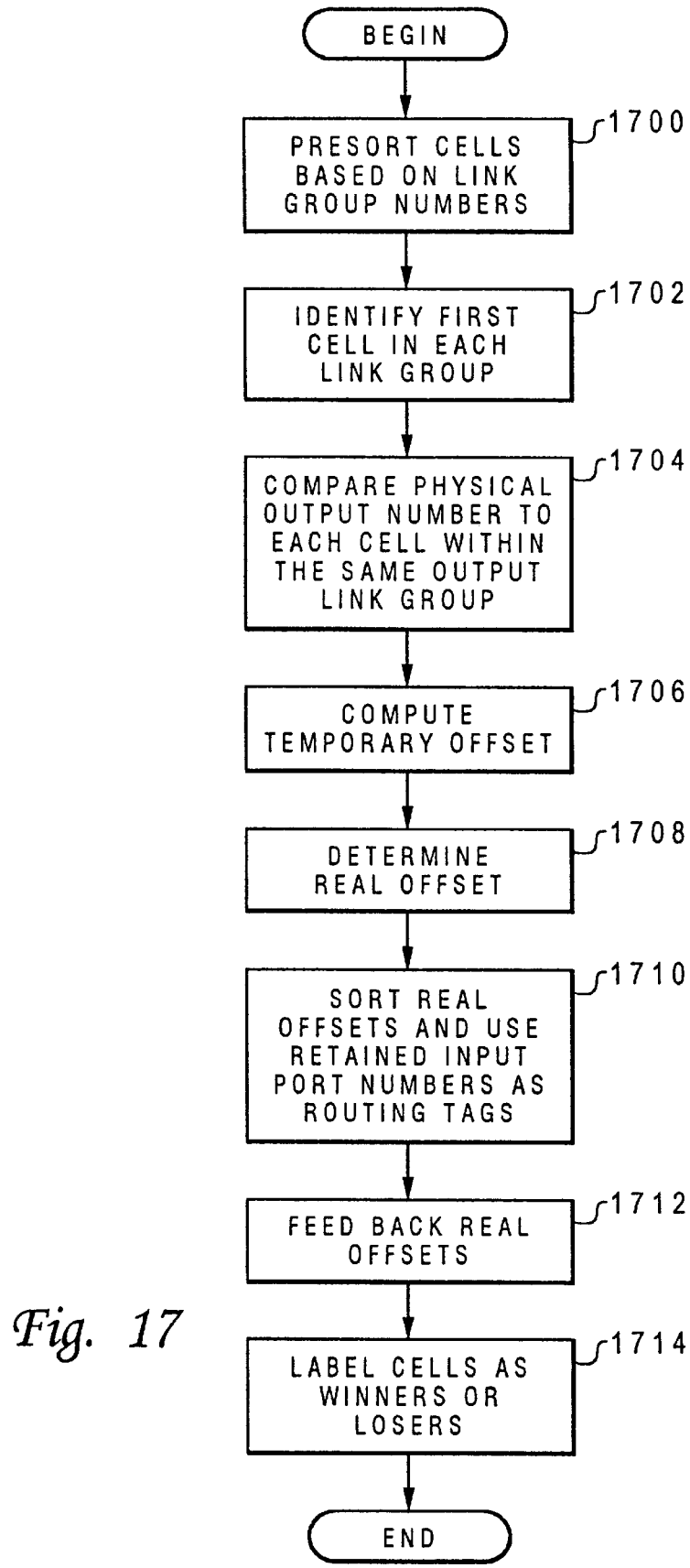
FIG. 17 depicts a flowchart of a process for performing a multi-link access algorithm according to the present invention.

With reference now to FIG. 17, a flowchart of a process for performing a multilink access algorithm is depicted according to the present invention. The process begins by sorting cells based on link group numbers (step 1700). Thereafter, the first cell in each group with respect to the outputs from a batcher sorting network are identified (step 1702). Thereafter, the first identified cell's physical output number is compared to each cell within the same output link group (step 1704). Thereafter, a temporary offset is computed by subtracting the physical output port number of the first cell in each link group from the physical output port number for each cell within a link group (step 1706). Thereafter, a real offset is determined (step 1708). Then, the offsets are sorted by using the retained input port numbers as routing tags (step 1710). Thereafter, the real offset at the output ports are then fed back into the corresponding input ports of the batcher sorting network (step 1712). Then, cells at the input port controllers are labeled as winners or losers (step 1714) with the process terminating thereafter.

VI. Fault Tolerance and Redundancy in Pd1_DbDest Switch

Figure 18:
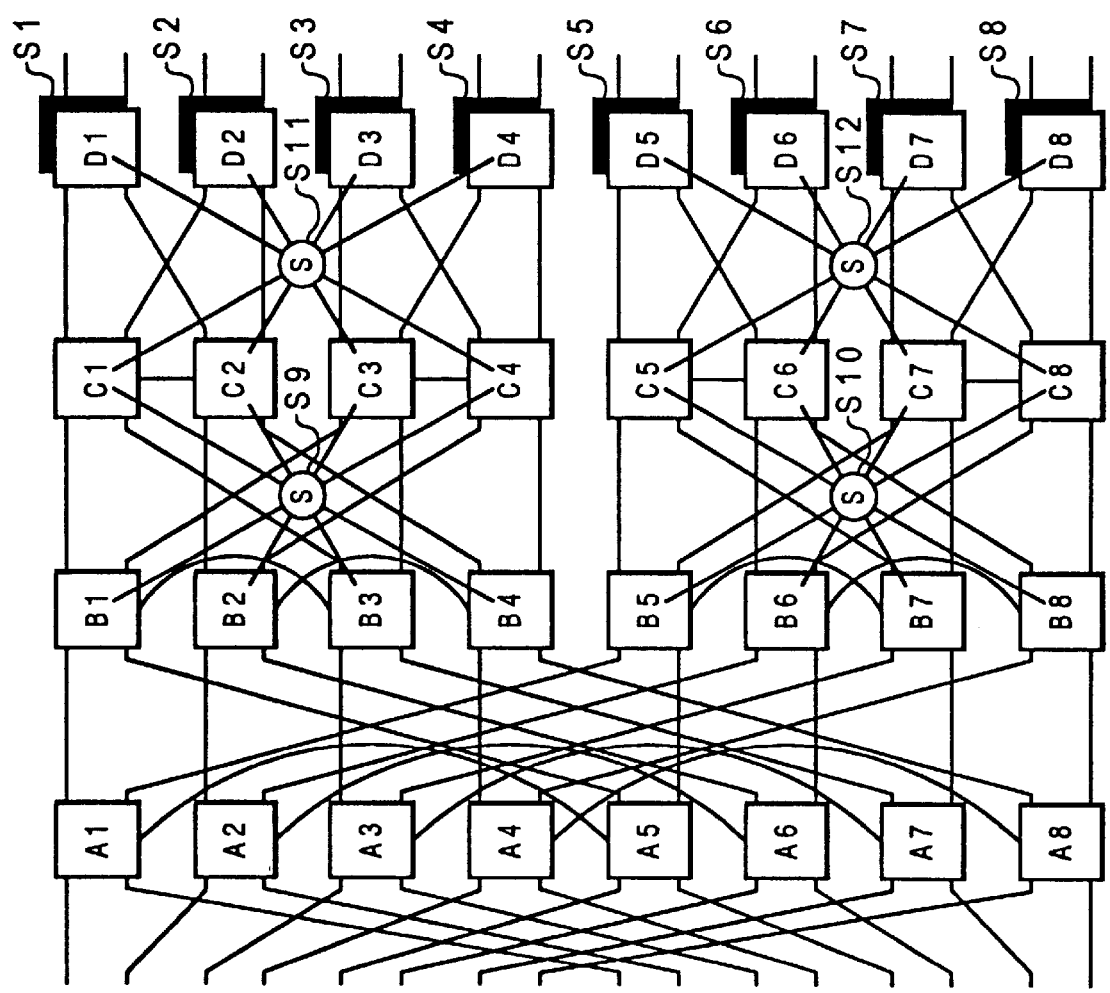
FIG. 18 is a block diagram of fault tolerance configuration for a modified banyan switch according to the present invention.

With reference now to FIG. 18, a block diagram of a fault tolerance configuration for a modified banyan switch is depicted according to the present invention. This configuration places redundant switch components throughout the whole switch fabric to allow recovery from single or multiple failures. As can be seen, banyan network 1800 includes 32 typical switch elements A1–A8, B1–B8, C1–C8, and D1–D8. In addition, spare switches S1–S12 are included for redundancy. In addition to spare switches, additional links are provided between existing switches. Switch A1 has an additional link to switch A5, switch A2 has an additional link to switch A6, switch A3 has an additional link to switch A7, and switch A4 has an additional link to switch A8. In stage 2, switch B1 has an additional link to switch B3, switch B2 has an additional link to switch B4, switch B5 has an additional link to switch B7, and switch B6 has an additional link to switch B8. In stage 3 of banyan network, switch C1 has an additional link to switch C2, switch C3 has an additional link to switch C4. Also, switch C5 has an additional link to switch C6 and switch C7 has an additional link to switch C8. In stage 4, each of the switches D1–D8 has an additional spare switch, spare switches S1–S8, associated for redundancy. In the depicted example, switches D1–D8 and spare switches S1–S8 may be implemented as a single set of dual switches in which one switch is the master switch and provides normal operation while the other switch is the slave switch and comes into service when the master switch fails.

For an N×N Pd1_banyan network, there are $\log_2 N$ stages, and each stage consists of N/2 switch elements, so that the Pd1_banyan network needs $(N/2)\log_2 N$ switch elements in total. With four Pd1_banyan networks in parallel according to the present invention, winning cells that come out of the concentrator will be distributed into these four parallel Pd1_banyan networks. Thus, for each Pd1_banyan network, only twenty five percent of the input ports are utilized. Hence, many idle switch elements can serve as spare units for the active switch elements.

The fault tolerance scheme illustrated in FIG. 18 is described in more detail as follows:

1. In an N×N Pd1_banyan network, stages are labeled from left to right as $\log_2 N-1$ to 0, and label each switch element in a stage from top to bottom is labeled as 0 to N/2−1. Hence, each switch element will have a two dimensional coordinate (i,j), wherein $i = \log_2 N-1$ to 0, and j=0 to N/2−1.

2. For each stage i excluding stage 0, which is treated separately, switch elements (ij) and $(ij+2^{i-1})$, form a pair to cover for each other and serve as a replacement unit when one of them fails. Moreover, for each stage i, wherein $i \neq 0$ and $i \neq \log_2 N-1$, the pair $[(ij),(i,j+2^{i-1})]$ share an additional common spare switch element with the pair $[(i,j+1), (i,j+1+2^{i-1})]$ to deal with the cases when (i) both elements in a pair fail simultaneously and (ii) only one element fails but the good element has to process cells coming from its two input ports, so that no resource in this good element is left for serving the cells from the bad element. For stage $\log_2 N-1$, since only the upper half of the stage will be used to handle incoming cells, the above case (ii) situation will never happen.

3. The scheme we described in item 2 above requires $N/8(\log_2 N-2)$ additional switch elements for an N×N M_banyan switch. For very large values of N, the number of additional switch elements will be 25% of the number of switch elements in the original network, since $\lim_{N \to \infty}$ $$\frac{\frac{N}{8}(\log_2 N - 2)}{\frac{N}{2}\log_2 N} = 0.25.$$

4. In stage 0, each switch element can be replaced by a dual switch unit, one switch is called the master switch and provides normal operation, while the other switch is called the slave switch and will come into service when the master switch fails.

Figure 19:
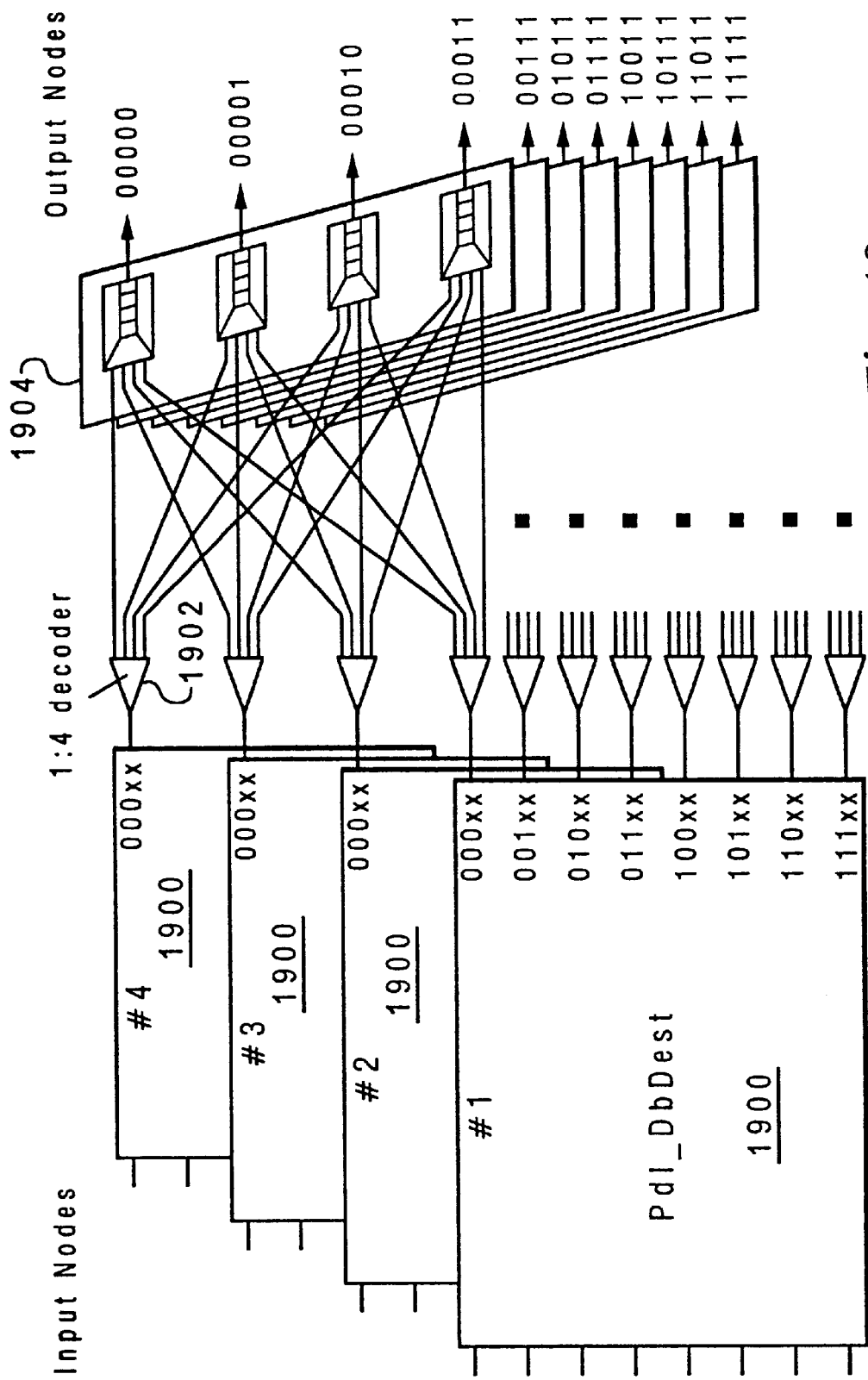
FIG. 19 depicts a block diagram of a 32×32×switch assembled using four 8×8 switch modules according to the present invention.

With reference now to FIG. 19, a block diagram of a 32×32 switch assembled using four 8×8 switch modules is depicted according to the present invention. In the depicted example, four switches 1900 are each 8×8 switches using an architecture such as that depicted for switch 300 in FIG. 3. The outputs from each of these switches are sent to decoders 1902, which are 1:4 decoders in the depicted example. The outputs from the decoders are sent to output nodes 1904 to finish the architecture for the 32×32 switch.

An ATM switch used in broadband ISDN can have more than ten thousand input and output ports. The batcher sorting network has limited size, since it requires bit synchronization of all input cells in each time slot. By using a divide-and-conquer method, small-sized switches may be used as modules to construct a large-sized switch.

Suppose a N×N switch consists of S switch modules, each with size (N/S)×(N/S) (where S is a design parameter). For example, in FIG. 19, a 32×32 switch is built by using four 8×8 switch modules. All of the input cells are partitioned randomly into S subsets which in turn feed into each (N/S)×(N/S) switch. In each (N/S) x (N/S) switch, cells are sorted and routed by Pd1_DbDest according to the most significant $\log_2(N/S)$ bits (i.e. $d_4 d_3 d_2$) of their destination addresses. At each output port of the Pd1_DbDest, there must has a 1:S decoder in order to route the cells to their final correct destinations. These 1:S decoders can be implemented by using a binary-tree, so that cells are routed according to the least significant $\log_2 S$ bits (i.e. $d_1 d_0$) of their destination addresses. A binary-tree 1:S decoders has $\log_2 S$ stages, thus, the total number of required switch element in each decoder is S−1.

For a N×N Pd1_DbDest switch without scaling, the hardware cost is as follows: (for simplicity, the trapping, concentration, and recirculation units are ignored)

$$N/4(\lg_2 N + (\log_2 N)^2) + k(N/2)(\log_2 N + D)$$

as follows:

$$S\left[\frac{N}{4S}\left(\log_2 \frac{N}{S} + \left(\log_2 \frac{N}{S}\right)^2\right) + k\left(\frac{N}{2S}\right)\left(\log_2 \frac{N}{S} + D\right) + (S-1)\frac{N}{S}\right] =$$

$$\frac{N}{4}\left(\log_2 \frac{N}{S} + \left(\log_2 \frac{N}{S}\right)^2\right) + k\left(\frac{N}{2}\right)\left(\log_2 \frac{N}{S} + D\right) + (S-1)N$$

Thus, for a given N, k, and D, the hardware cost for the scaled modular approach is a mainly linear relation with S.

From the above comparison of hardware costs, we see that the scaled modular approach requires more hardware cost, but this extra cost can be compensated for by the increasing stability, VLSI feasibility, since a faulty switch element in a module of smaller size has less effect than that in a switch of larger size, and also, due to the limitation on the total pin number of a VLSI chip, a real large size switch is not feasible.

VI. Examples

Cells may be lost due to the output port contention or internal blocking of the Pd1_banyan networks. In this section, we present simulation results for cell loss in Pd1_DbDest as a function of various system parameters, such as the size of the front common shared recirculation buffer (M), the number of dilated stages (D), and the number of the Pd1_banyan networks in parallel (k). The results were obtained by running simulations on the Cray Y-MP supercomputer and using recursive programming techniques. The simulations assumed degree-two-dilated stages and are simulations of single switch units.

A. Cell Loss Under Independent Uniform Traffic

In independent uniform traffic, the arrival of cells at input ports is governed by independent and identical Bernoulli processes of probability p, and the requested output port for a cell is uniformly selected among all output ports. The term "offerload" is employed to denote p. Hence, each cell has equal probability 1/N of being destined to any given output, and successive cells are independent.

Figure 20:
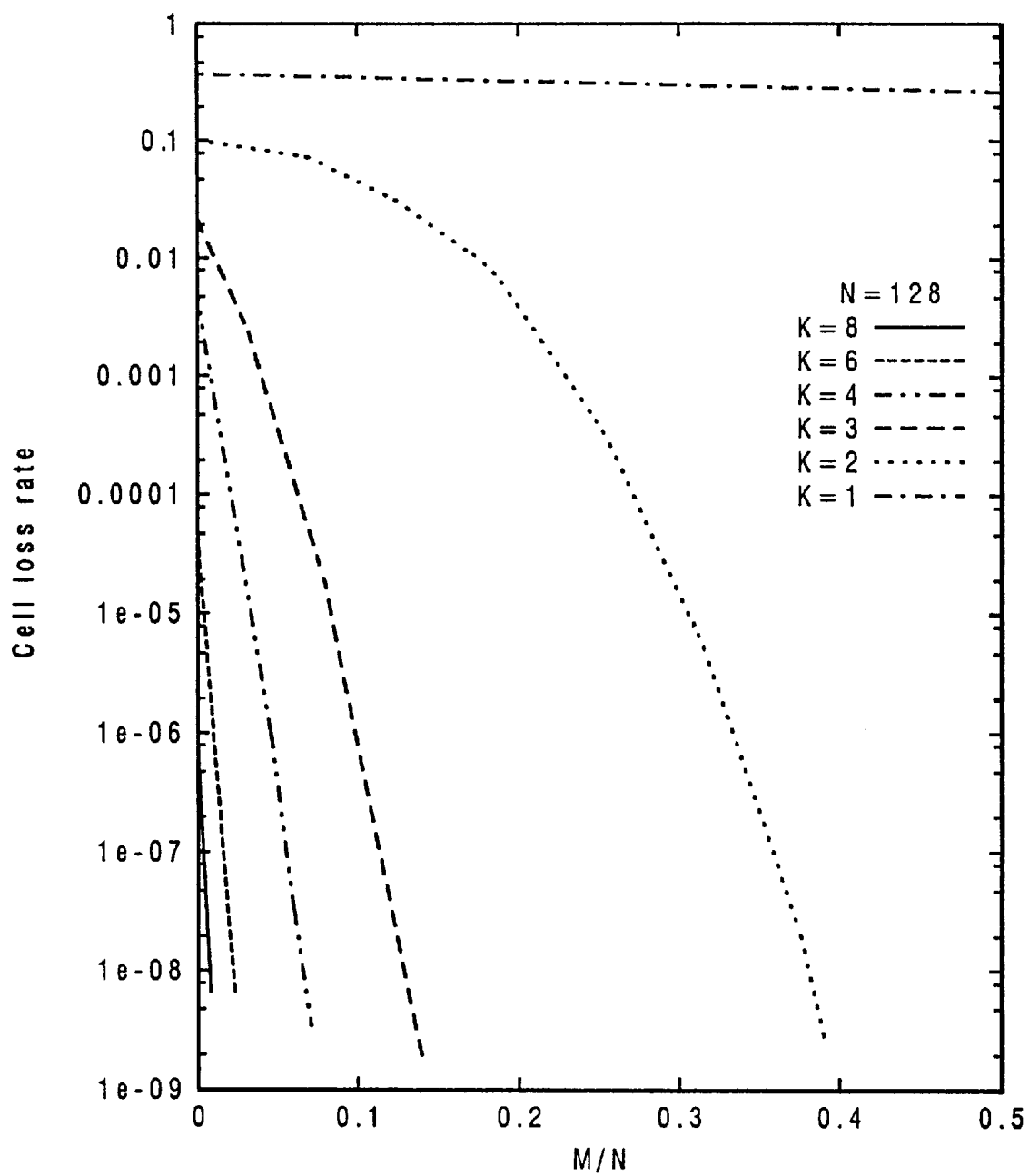
FIG. 20 is a plot of cell loss rates in a SunShine switch with multiple parallel 128×128 (N=128) banyan networks as a function of M/N under a full load of uniform traffic.
Figure 21:
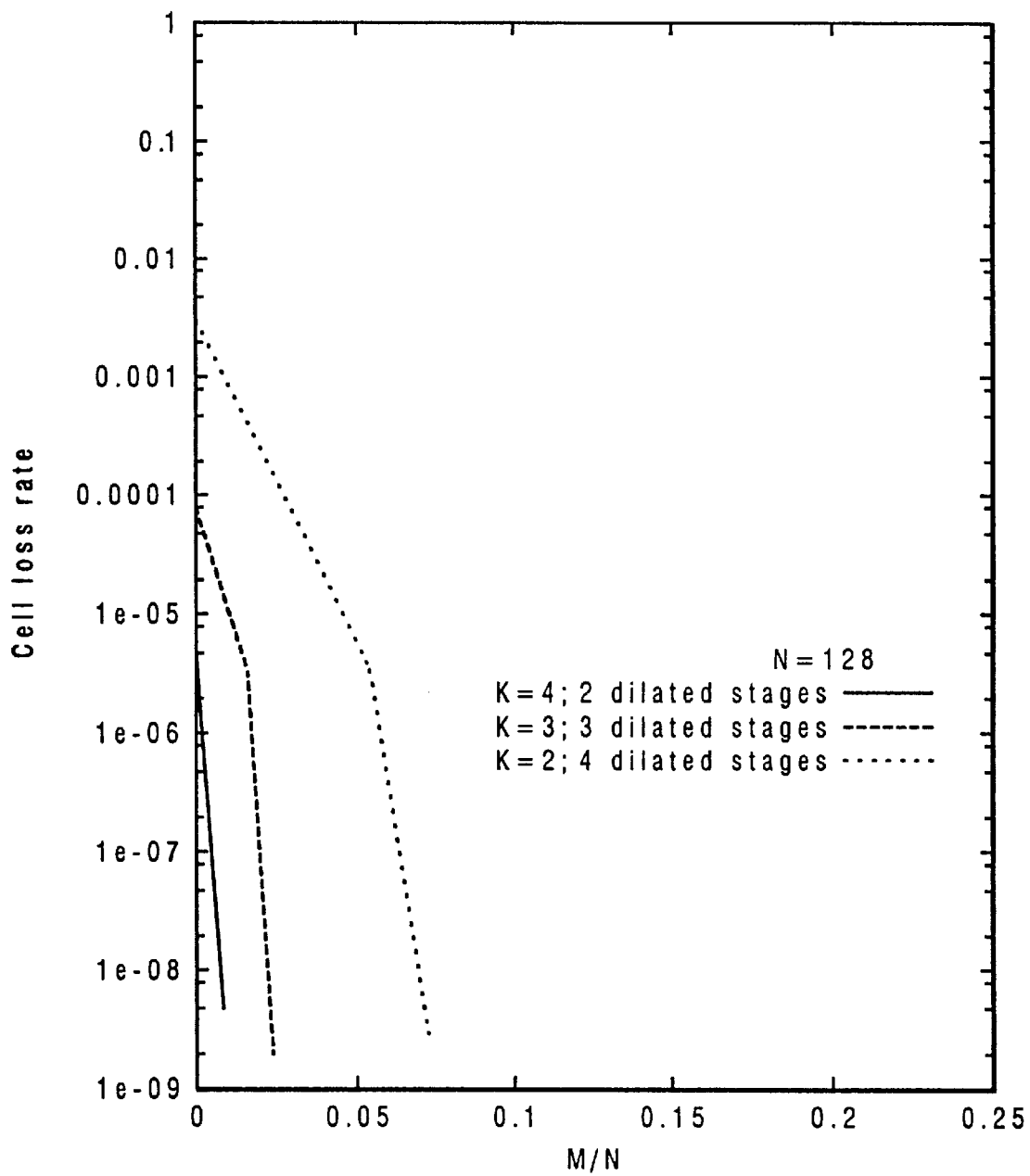
FIG. 21 is a plot of cell loss rates in a Pd1_DbDest switch with various multiple parallel 128×128 (N=128) Pd1_ banyan networks as a function of M/N under a full load of uniform traffic according to the present invention.

With reference now to FIG. 20, a plot of cell loss rates in a SunShine switch unit with various multiple parallel 128×128 (N=128) banyan networks as a function of M/N under a full load of uniform traffic is depicted. In FIG. 21, a plot of cell loss rates in a Pd1_DbDest switch unit with various multiple parallel 128×128 (N=128) Pd1_banyan networks as a function of M/N under full a load of uniform traffic according to the present invention.

In the SunShine switch unit, the cell loss rate is a function of M/N for different input offerloads p. For a single banyan network (k=1) of size N=128, at high offerload when p is in the range of 0.8 to 1.0, the cell loss rate remains quite high even if the M/N ratio increases to 0.8 or higher (see FIG. 20). This result is expected because the throughput of Batcher-Banyan (i.e., a batcher sorting network followed by a banyan network) is limited to 0.58 at full load due to the output conflict. On the other hand, at low offerload, when p is less than 0.4, the SunShine switch unit can easily achieve the usually acceptable loss rate of $10^{-6}$ with an M/N value of about 0.3. As the number of the parallel banyan network k increases, significant performance improvement occurs as shown in FIG. 20 where the cell loss rate at full load under uniform traffic is plotted as a function of M/N for various k values. It is apparent from the results that with k equal to four, and M/N about 0.06, a loss rate of $10^{-6}$ is achievable. As illustrated in FIG. 21, the Pd1_DbDest switch unit also can achieve a loss rate of $10^{-6}$ with k equal to only two, and same value of M.

Another approach is to use banyan networks in tandem as described in M. J. Karol, M. G. Hluchyj, and S. P. Morgan, *Input Versus Output Queuing on a Space-Division Packet Switch,* IEEE Trans. Commun., Vol. 35, December 1987. All the input cells go into the first banyan network. When a conflict between two cells occurs at one switch element, the loser cell will be tagged as "wrong" so that it will not affect the routing of "good" cells at any of the downstream switch elements. At the output of the first banyan network, the cells that have reached their destinations will be directed into output port buffers, but the misrouted cells will be detagged and fed into the second banyan network for a second chance of routing. The whole procedure is repeated through k banyan networks in series. Hence, the desired packet loss rate of $10^{-6}$ can be achieved with a sufficiently large k value, because the offerload in the successive banyan networks decreases gradually. Thus, the output contention conflict also is reduced. The packet loss rate is a function of k and p, and for a banyan network of size N=128 and k=11, a loss rate of $10^{-6}$ is achieved under full load and uniform traffic.

From the above discussions, the SunShine switch unit outperforms the tandem-banyan fabric that has no recirculation buffer because, for N=128, the former needs a smaller number of banyan networks to achieve the desired loss rate ($10^{-6}$) and because the latter causes longer end-to-end delay. Even for tandem-banyan fabric with recirculation buffer, its performance is still not as good as that of the SunShine switch since tandem-banyan requires more number of banyan networks, larger total size of recirculation buffers, and possibly demands larger time slot period. Moreover, the performance of the tandem-banyan degrades as N becomes larger; on the other hand, the performance of the SunShine switch unit improves as N increases until the performance becomes saturated.

Figure 22:
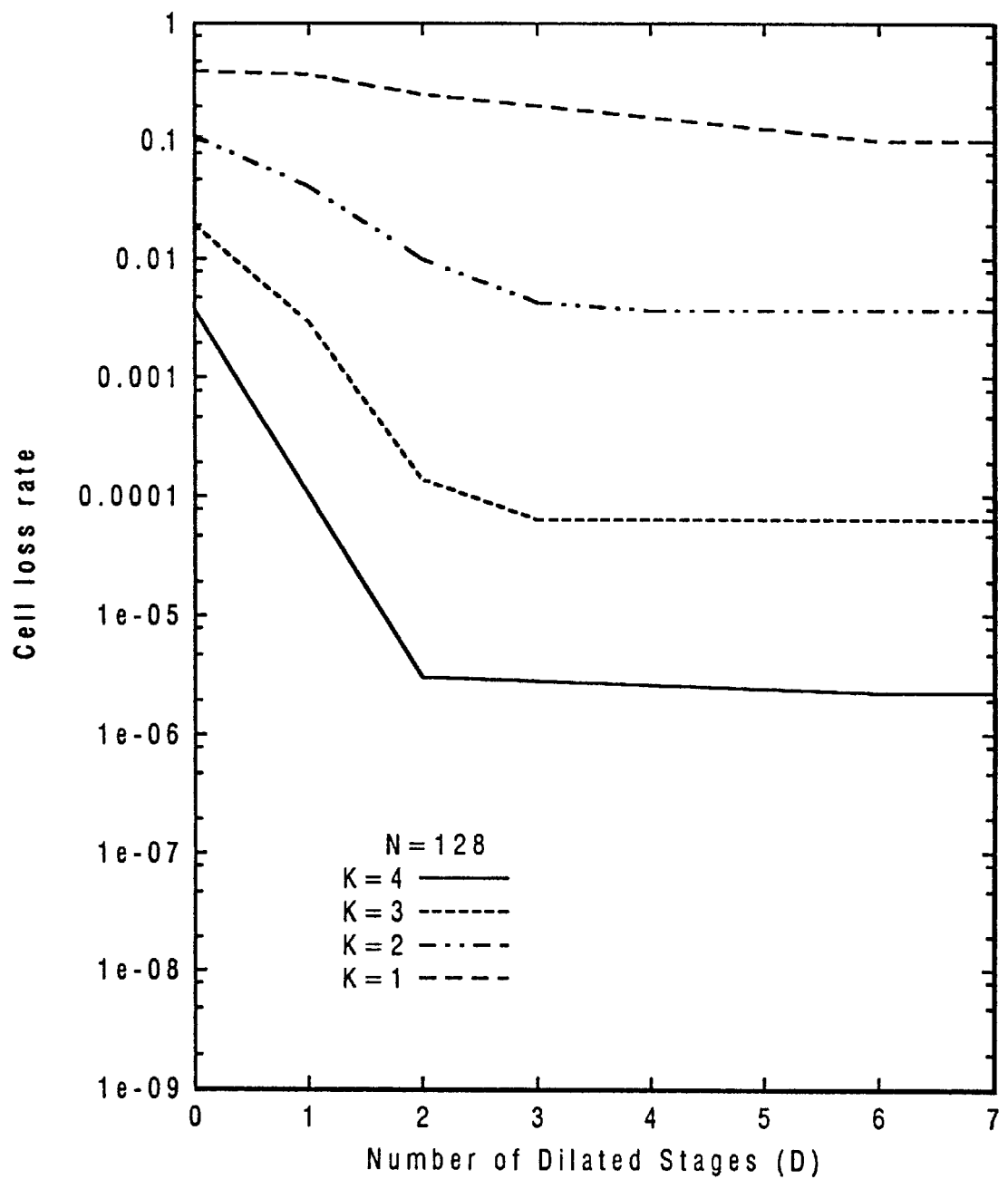
FIG. 22 is a plot of cell loss rates in a Pd1_DbDest switch with various multiple parallel 128×128 (N=128) Pd1_ banyan networks as a function of dilated stages (D) without a front recirculation buffer (M=0) and a full load of uniform traffic according to the present invention.

In order to find out the effect of the number D of dilated stages on cell loss and the optimal value of D for Pd1_DbDest with k Pd1_banyans in parallel, simulations were run and the results plotted as shown in FIG. 22 for cell loss rate of the Pd1_DbDest switch unit with size N=128 and various values of k, with no front recirculation buffer (i.e. M=O), as a function of D under full load of uniform traffic. Turning to FIG. 22, a plot of cell loss rates in a Pd1_DbDest switch unit with various multiple parallel 128×128 (N=128) Pd1_banyan networks as a function of D without a front recirculation buffer (M=0) under a full load of uniform traffic is depicted according to the present invention. From FIG. 22, it is apparent that with k=4 and D=7, i.e. full dilation, the cell loss is about $10^{-6}$ which can be further reduced to $10^{-9}$ if a proper size of front recirculation buffer is applied. Also, with the same k=4, but D=0, i.e. no dilation, the cell loss is about $3.8\times10^{-3}$ which is about the same as that in the SunShine switch unit with k=4 and M=O. Thus, the number D of dilated stages has a great effect on cell loss. With further observation, it is apparent that with D=1, the cell loss improves 40 times to the order of $10^{-4}$, and with D=2 the cell loss further improves to the order of $10^{-6}$ which is about the same performance as D=7. Hence, the optimal value of D is 2 when k=4. Also, for k=3, the optimal value of D is 3, and for k=2, the optimal value of D is 4. From the above analysis, it appears that the partial dilated banyan networks can achieve good performance/cost ratio.

Moreover, with the degree-2-dilated strategy, the extra switch elements and links on those dilated stages can serve as fault tolerant spare components.

Once the optimal D value for various k when M=0 was found, simulations were run for the cases when k=2, k=3, and k=4 to show the effect of the value of M/N on the performance of the Pd1_DbDest switch and further reduce the cell loss rate. The best Pd1_DbDest design is to have k=4. As FIG. 21 shows, for k=4, the performance of the Pd1_DbDest switch unit reaches $10^{-9}$ cell loss rate with M/N=0.8% (M=1). We plot the cell loss rates (FIG. 21) for the Pd1_DbDest switch unit with two, three, and four parallel 128×128 (N=128) Pd1_banyan networks versus different M/N ratios at full load under uniform traffic. It is observed that without the common shared recirculation buffer (M=0), the network barely reaches the cell loss rate value at $10^{-4}$ for k=3 ($3.8\times10^{-3\ for\ k}$=2). As M/N increases to 0.023 for k=3 (0.07 in k=2), the switching system can achieve the loss rate of $10^{-9}$. Thus, a size of about 3 cells (9 in k=2 case) at the front common shared recirculation buffer M is sufficient. The reason that M increases as k decreases for a fixed loss rate is that in our switch, each Pd1_banyan network tries to accommodate two cells per destination. If k is only 2, only 4 cells per destination are allowed, causing a large number of cells to be recirculated. Thus the size of the front recirculation queue needs to be increased when k decreases in order to maintain a desired loss rate.

From the above observation, it appears that the size of the front common shared recirculation buffer (M), can be significantly reduced by increasing the number of Pd1_banyan networks in parallel (k) to shift the load of the recirculation buffers to the output ports where more cost-efficient RAM memory can be used. (In the switch according to the present invention, assume infinite-sized output queues were assumed). Moreover, output buffering was shown to achieve better performance than that of input buffering.

Compared with the performance in the SunShine switch unit, the Pd1_DbDest switch unit has half the hardware cost of the parallel banyan networks used in SunShine model and yet obtains the same performance. Hence, it is quite clear that the Pd1_DbDest switch unit outperforms the SunShine model which in turn outperforms the tandem-banyan fabric.

Similar simulations to the ones in FIG. 22 were run for N=512 and N=1024. These simulations showed that when the size of the Pd1_banyan network grows larger in the Pd1_DbDest switch unit, the required saturated number of dilated stages D to achieve the same cell loss rate remains unchanged for the same k. This becomes a very favorable factor in designing very large-scale switching networks.

Figure 23:
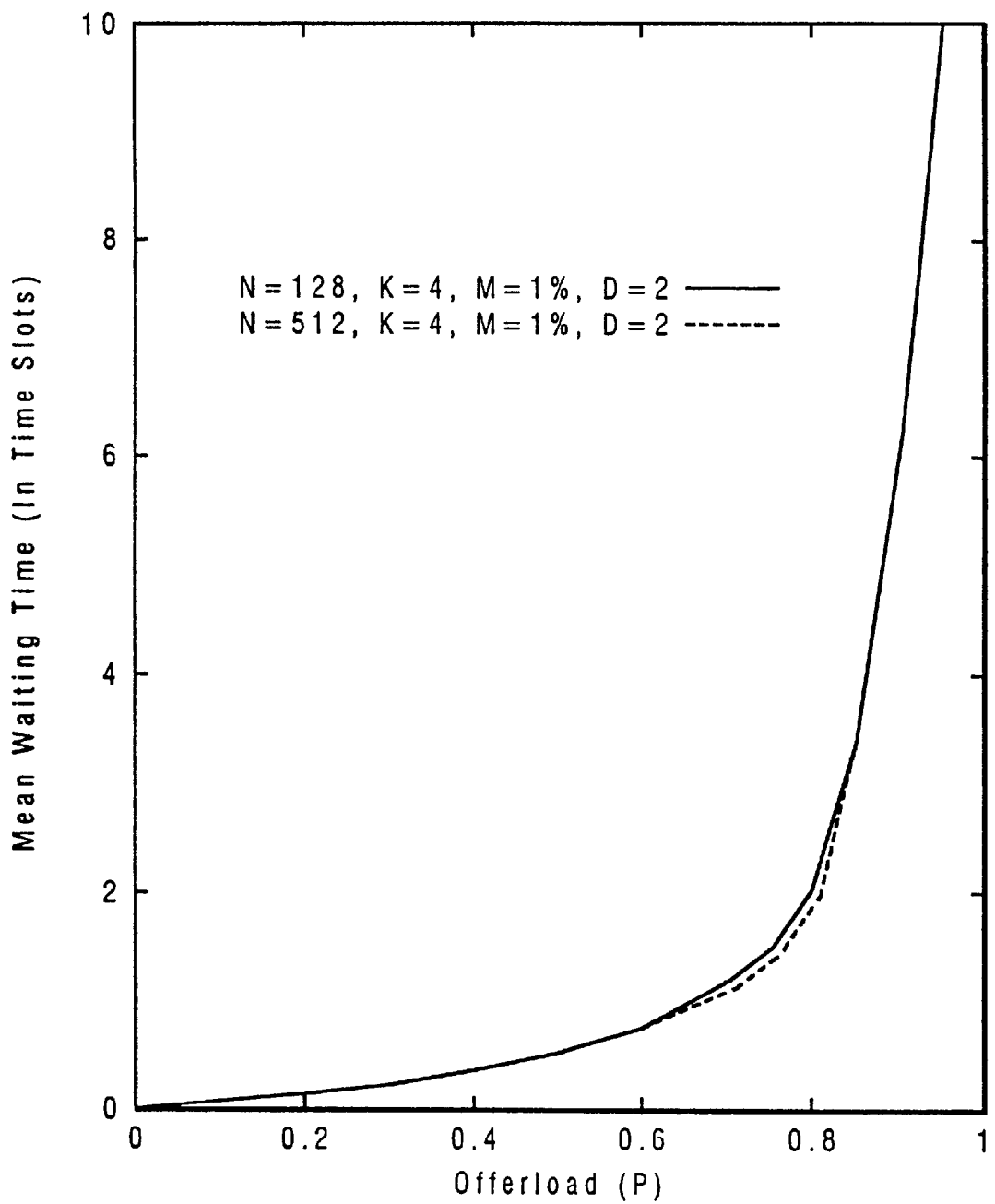
FIG. 23 depicts a plot of the mean waiting time versus offerload with k=4, m=1%, and d=2 under uniform traffic and a Pd1_DbDest switch according to the present invention.

Finally, FIG. 22, is a plot of the mean waiting time versus offerload with k=4, M=1%, and D=2 under uniform traffic in the Pd1_DbDest switch unit according to the present invention, also supports our claim that large values of N would not increase delay under various offerloads. By comparing FIG. 23 with the diagram of the results obtained by using pure output queuing strategy it appears that the Pd1_DbDest switch unit is able to use k=4 to obtain the performance of pure output queuing.

B. Cell Loss Under Bursty Traffic

In network flow control, user traffic should be monitored in order to prevent interference between users. For a connection-type service, before call set up, the user needs to provide information about the maximum burst length, peak bit rate, and average bit rate to the network manager who will make a decision to accept or reject the request. Through the whole service period, the bit rate behavior will be monitored so that users with lower bursty traffic would not be delayed by the higher bursty traffic of other users.

In the Pd1_DbDest switch unit, the distribution of burst length (duration) is assumed to be the same for all bursts arriving at any input line, and burst lengths are chosen independently by a geometric distribution; the average number of time slots between cells of a given burst is defined as the separation which also follows another geometric distribution. It is also assumed that the output port requested by a burst is uniformly distributed over all output ports. If the separation becomes unity, then the traffic model becomes the back-to-back queue model. Furthermore, if the separation and the duration all become unity, then the traffic model is the independent uniform traffic.

Figure 24:
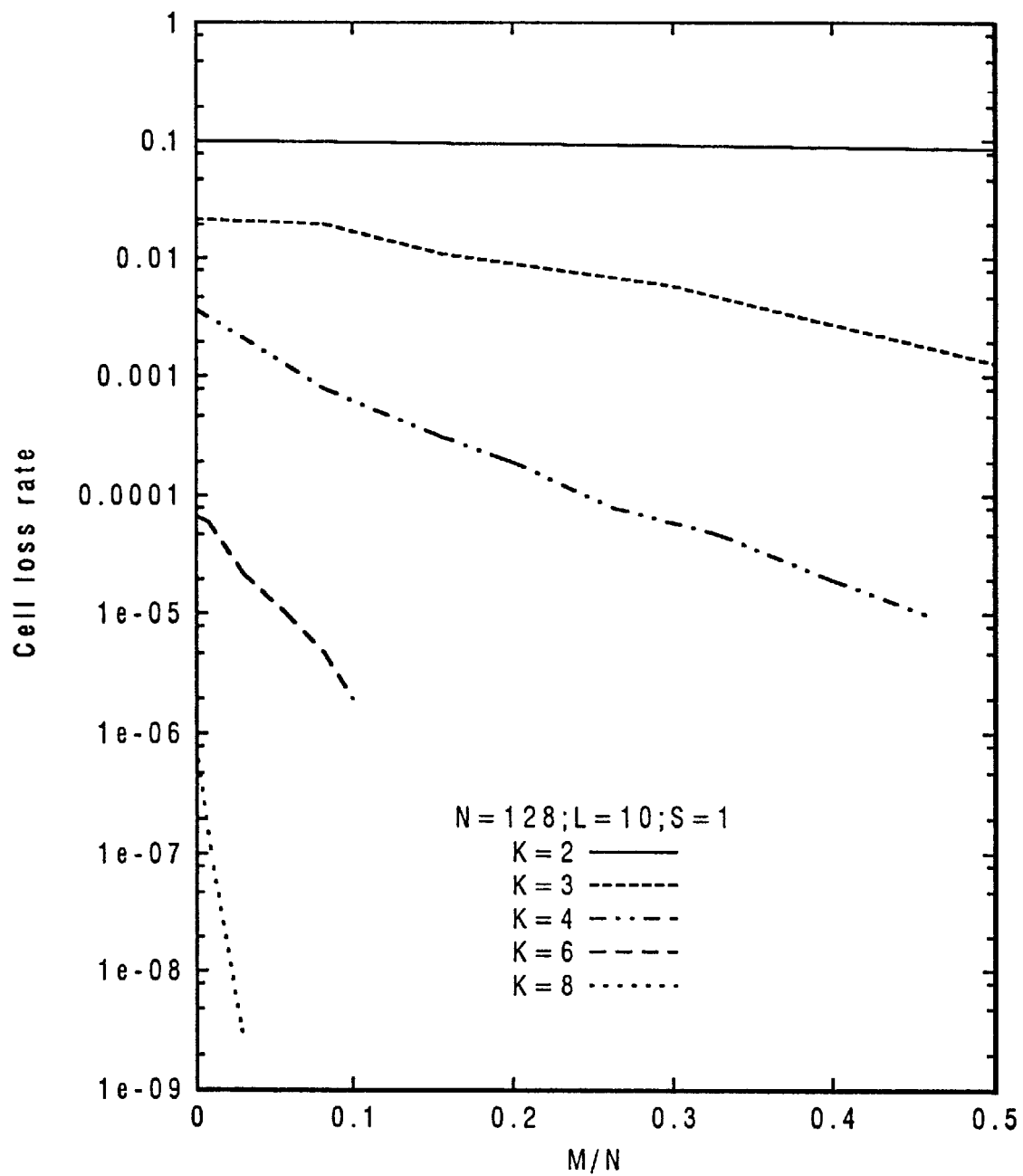
FIG. 24 is a plot of cell loss rates in a SunShine switch with various parallel 128×128 (N=128) banyan networks as a function of M/N under a saturated load of bursty traffic with a mean duration=10 and a mean separation=1.
Figure 25:
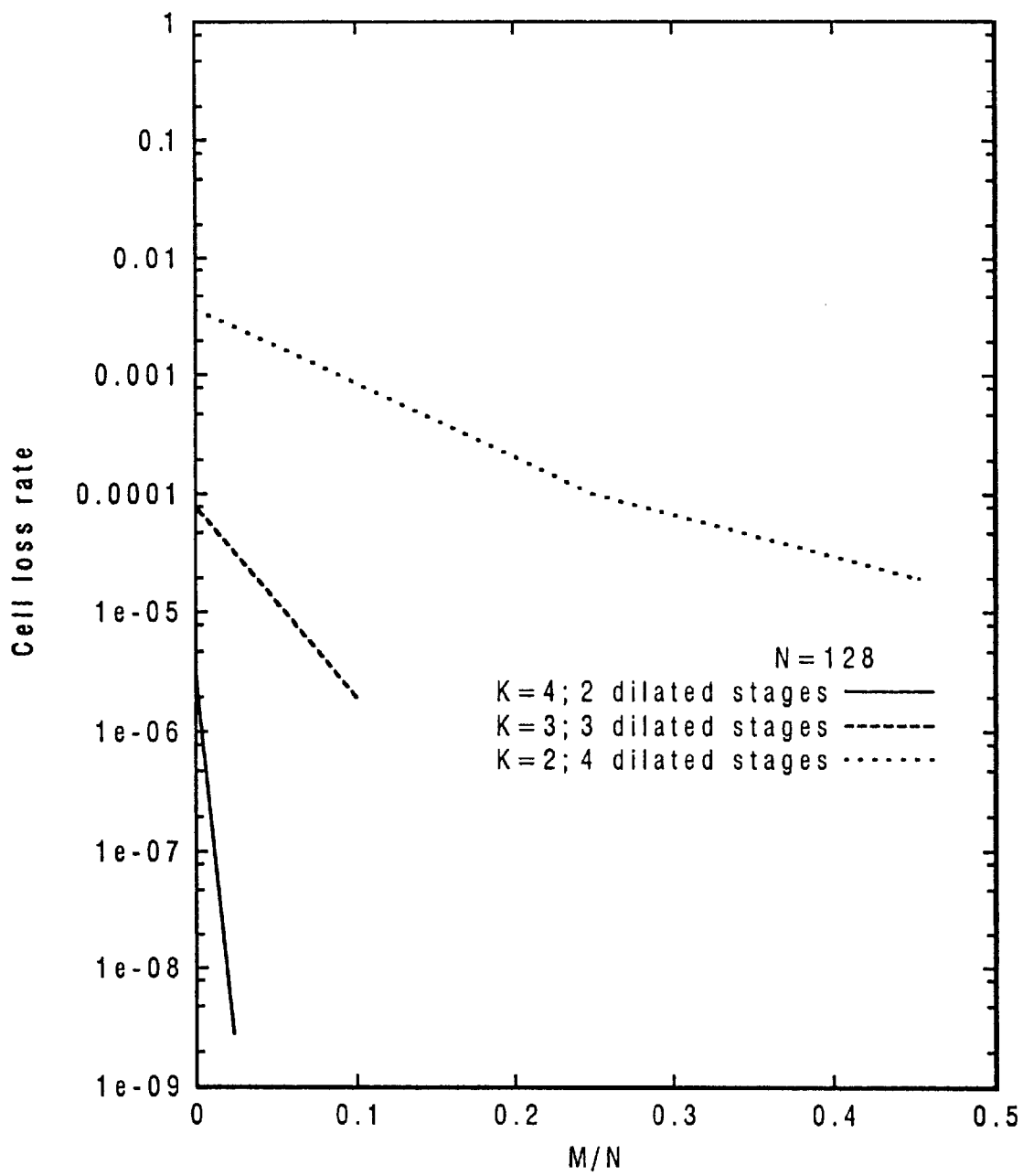
FIG. 25 depicts cell loss rates in a Pd1__DbDest switch with various parallel 128×128 (N=128) Pd1__banyan networks as function of M/N under a saturated load of bursty traffic with a mean duration=10 and a mean separation=1 according to the present invention.

FIG. 24 and FIG. 25 show the cell loss rates as a function of M/N for different k values when the mean duration is 10 cells, and mean separation is 1 time slot (i.e. back-to-back model) with saturated load (i.e. cells come every time slot). FIG. 24 is for the SunShine model, and FIG. 25 is for the Pd1_DbDest switch unit. It appears that the size of the shared recirculation queue (M) is less important than the number of k of the parallel banyan networks in both fabrics due to the possibility of mass burst cells destined to the same output port for substantially long burst lengths. Again, in the SunShine switch unit, for k=4 and M/N about 0.1 the loss rate is only $10^{-3}$. In the Pd1_DbDest switch unit with D equal to 2 and k=4, the cell loss rate is about $10^{-9}$ with M/N at 0.023 (M=3). The SunShine switch unit can achieve the same loss rate of $10^{-9}$ only when k increases to 8 and with about the same M/N ratio. Thus, once again, the Pd1_DbDest switch unit uses half the hardware cost of the parallel banyan networks used in the SunShine switch unit to reach the same performance as the SunShine switch unit even under bursty traffic patterns.

C. Linked Outputs

For the link grouping in the Pd1_DbDest switch unit, each link group has equal size. In the computer simulation, instead of counting the cell loss rate, the loss rate of datagrams that consists of several cells is counted. The loss of even one cell implies the loss of the whole datagram. Only a bimodal distribution of datagrams is used, single-cell datagrams and multiple-cell datagrams which consist of 100 cells. The traffic profile is assumed to have 80% single-cell datagram arrivals and 20% 100-cell datagram arrivals.

Figure 26:
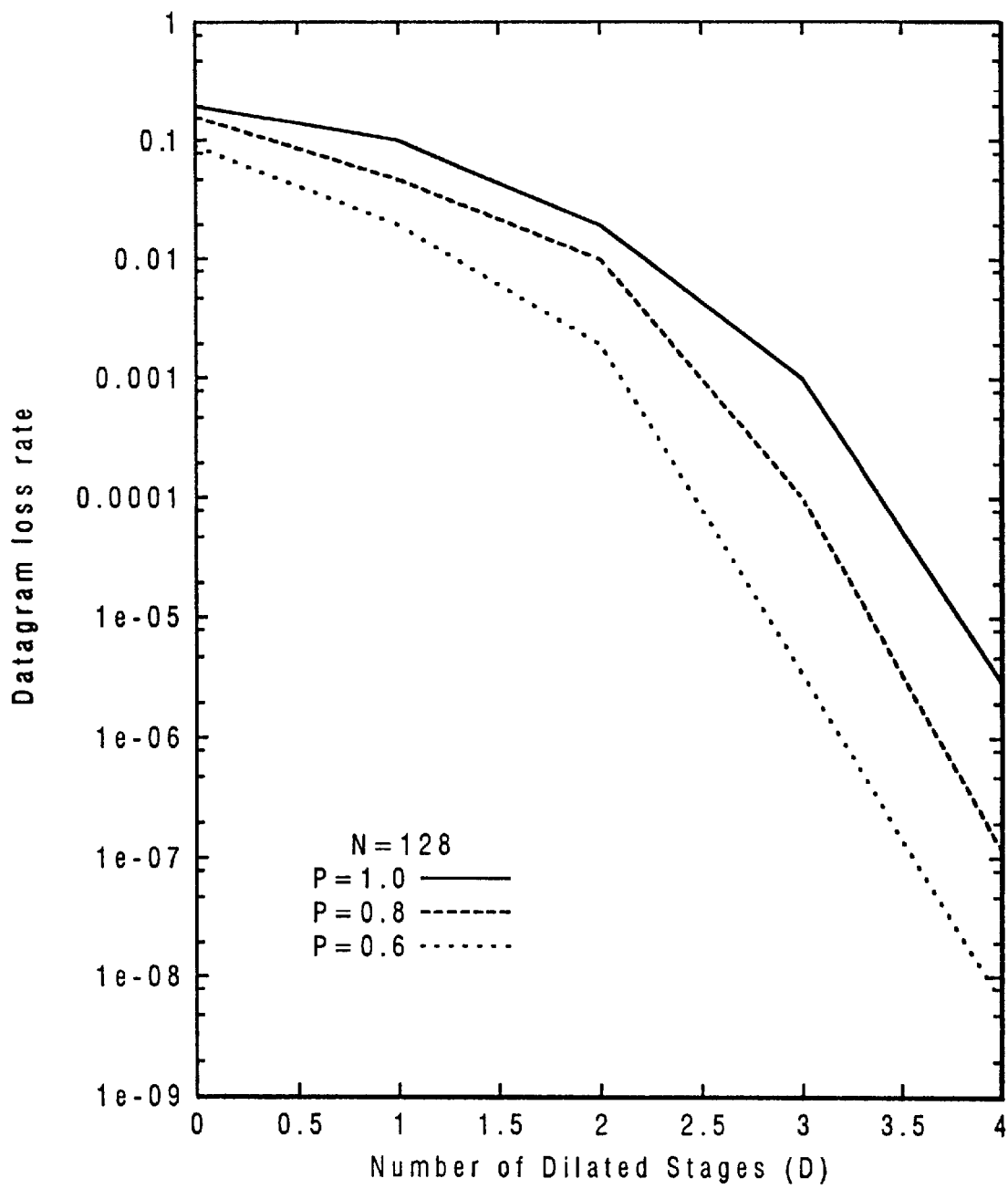
FIG. 26 is a plot showing loss rates in a Pd1__DbDest switch with two parallel 128×128 (N=128) Pd1__banyan networks as a function of dilated stages (D) under various offerload of bimodal datagram traffic with a means separation=3 and a group size=2 with M=50% according to the present invention.

FIG. 26 is a plot illustrating datagram loss rates in Pd1_DbDest with two parallel 128×128 (N=128) Pd1_banyan networks as a function of dilated stages (D) under various offerload of bimodal of datagram traffic with mean separation=3 and group size=2 with M=50%. From FIG. 26, it is apparent that the performance of the Pd1_DbDest switch unit improve significantly with small increase of the D value even under heavy bursty traffic.

A special case of multilink access algorithm occurs when the link group sizes all become unity. In this case, the real offsets become meaningless and the temporary offsets are used to find the "winner" cells. Moreover, the group ID request becomes the same address as the physical output request address, so that only step 0 to step 3 are required. For special case of the multilink access algorithm, in order to identify the first occurrence of each output destination request, each output port of the batcher sorter network needs a $\log_2 N$-bit magnitude comparator. The comparator has a hardware complexity of at lease $O(\log_2 N)$ if it assumed that a one-bit comparator has the same hardware cost of a 2×2 switch element. Then, the total hardware complexity of comparators of a batcher sorter network with N outputs $O(N\log_2 N)$. Moreover, a broadcast bus and a $\log_2 N$-bit sorter subtractor are required to compute the temporary offsets. Hence, the overall complexity of the needed hardware to execute is $O(N\log_2 N)$. This special multilink access algorithm can be applied to the hardware design for trap network.

Thus, the present invention provides an improved switching system through the use of a modified banyan network having dilated stages. In particular, the present invention provides a high performance, fast, self-writing broadband cell switch architecture based on batcher-banyan type networks. The Pd1_DbDest switch unit includes several Pd1_banyan networks with D degree-2-dilated stages in each network, a front common shared recirculation buffer, and an output queue in each output port to provide the improved performance. The present invention allows for the handling of output overloads under bursty traffic through the parallel Pd1_banyan networks and output queues. Additionally, the present invention, in the depicted example, allows two cells per destination through the use of the D degree-2-dilated stages in the Pd1_banyan networks. Thus, the present invention provides for the same performance as currently employed switch architectures, but with half the hardware cost in the parallel banyan networks. Consequently, cost and weight are reduced for switches designed according to the present invention.

Additionally, the present invention provides an architecture to tolerate single and multiple faults in an economical manner. In addition, the technology employed consumes very little power compared to TTL or ECL-based switches and is scalable to handle varying amounts of traffic within a communications system. In particular, the switches of the present invention are particularly suited for implementation on board satellites as well as on the ground. The present invention also provides the ability to implement both switches for small and very large systems with equal case by employing high performance BiCMOS or CMOS VLSI implementation and by employing a three dimensional packaging structure to achieve the speeds of 150 Mbps or 600 Mbps. The architecture of the present invention allows for small cell loss rates and a small end-to-end cell delay with a low hardware cost ratio. Additionally, the present invention provides the further advantage of reducing cell loss and increasing throughput, especially under heavy bursty traffic, through the unique link grouping technique and efficient multilink access algorithm. Finally, the present invention provides for redundancy that allows for the switch to recover from single or multiple failures within the Pd1_banyan networks.

The description of the preferred embodiment of the present invention has been presented for purposes of illustration and description, but is not intended to be exhaustive or limit the invention in the form disclosed. Many modifications and variations will be apparent to those of ordinary skill in the art. For example, the present invention may be employed to provide routing for other types of data packets other than ATM cells. The embodiment was chosen and described in order to best explain the principles of the invention and the practical application to enable others of ordinary skill in the art to understand the invention for various embodiments with various modifications as are suited to the particular use contemplated.

What is claimed is:

1. An apparatus for routing a plurality of data packets comprising:
   a plurality of inputs, wherein the plurality of data packets are received at the plurality of inputs, each data packet within the plurality of data packets including routing information;
   a plurality of outputs, wherein the plurality of outputs are associated with a plurality of destinations such that each output within the plurality of outputs corresponds to a destination within the plurality of destinations; and routing means for routing the plurality of data packets received by the plurality of inputs through the switch to the plurality of outputs using the routing information, wherein the routing means includes a number of single path switching matrixes, each single path switching matrix having a plurality of stages, wherein a portion of the plurality of stages are dilated such that at least two data packets may be routed contemporaneously to a single destination within the plurality of destinations.

2. The apparatus of claim 1, wherein a number of cells within the plurality of cells are misrouted by the routing means and further comprising:

sorting means, responsive to the plurality of data packets being received at the plurality of inputs, for sorting the plurality of data packets using the routing information in each data packet within the plurality of data packets; and buffer means having a first connection connected to the routing means and a second connection connected to the sorting means, wherein misrouted cells are sent to the buffer means by the routing means, stored in the buffer means, and sent to the sorting means after a period of time.

3. The apparatus of claim 2, wherein the period of time is selected to coincide with a timeslot in which another plurality of cells arrives at the plurality of inputs.

4. The apparatus of claim 1 further comprising redundancy means, responsive to a failure of a portion of the routing means, for allowing the routing means to continue to route the plurality of data packets.

5. The apparatus of claim 4, wherein the routing means includes a plurality of switching elements for routing the plurality of data packets and wherein the redundancy means includes a number of redundant switching elements, a portion of the redundant switching elements being used to route the plurality of data packets in response to a failure of a portion of the plurality of switching elements within the routing means.

6. The apparatus of claim 4, wherein the routing means includes a plurality of switching elements for routing the plurality of data packets, the plurality of switching elements being connected to each other by links, wherein the redundancy means includes a plurality of spare links connecting the plurality of switching elements, a portion of the plurality of spare links being used to route the plurality of data packets within the plurality of switching elements in response to a failure of a portion of the plurality of switching elements.

7. The apparatus of claim 1 further comprising linking means for linking a portion of the plurality of outputs to form a linked output, wherein the linked output is associated with a destination within the plurality of destinations.

8. The apparatus of claim 1, wherein the plurality of data packets is a plurality of cells.

9. The apparatus of claim 8, wherein the plurality of cells is a plurality of asynchronous transmission mode cells.

10. The apparatus of claim 1, wherein the apparatus is a satellite switch.

11. The apparatus of claim 1, wherein the apparatus is a terrestrial switch.

12. The apparatus of claim 1, wherein the apparatus is a switching unit.

13. A method for routing a plurality of data packets in a switching system having a plurality of inputs and a plurality of outputs, the method comprising:

receiving the plurality of data packets at the plurality of inputs, wherein each data packet within the plurality of data packets includes a destination such that the plurality of data packets have a plurality of destinations and each destination within the plurality of destinations is associated with an output within the plurality of outputs; and routing each data packet within the plurality of data packets through a plurality of switching elements within the switching system towards the plurality of outputs using the plurality of destinations, wherein the plurality of switching elements are arranged in a number of stages to form at least one single path switching matrix, wherein a portion of the stages within the single path switching matrix are dilated stages in which at least two data packets may be concurrently routed to a destination within the plurality of destinations.

14. A switch unit comprising:

a plurality of input port controllers having a plurality of inputs and outputs, wherein a plurality of data packets are received at the plurality of inputs, each input port controller within the plurality of input port controllers, responsive to receiving a data packet within the plurality of data packets at an input within the plurality of inputs associated with the input port controller, attaching a header to the data packet, the header containing routing information including a destination for the data packet;

a batcher sorting network having an input connected to the outputs of the plurality of input port controllers and an output, wherein the batcher sorting network sorts the data packets using the routing information within the header attached to each data packet within the plurality of data packets, generating a plurality of sorted data packets;

an output contest network having an input connected to the output of the batcher sorting network for receiving the plurality of sorted data packets and an output, wherein the output contest network resolves contention for destinations and in response to a number of data packets being routed to the same destination, marking a first portion of the number of data packets for routing to the destination and a second portion of the number of data packets for recirculation forming a plurality of marked data packets;

a concentrator network having an input connected to the output of the output contest network for receiving the plurality of marked data packets, a first output connected to the batcher sorting network and a second output, wherein the concentrator network sends the first portion of data packets to the second output and recirculates the second portion of data packets to the batcher sorting network through the first output;

a plurality of switching networks, each switching network having an input connected to the second output of the concentrator network, each switching network including:

a first plurality of switching elements arranged in a number of stages, wherein each stage within the number of stages has a number of switching elements from the plurality of switching elements and a first stage within the number of stages is connected to the plurality of outputs; and a second plurality of switching elements arranged to form a number of dilated stages, wherein a first dilated stage within the second plurality of switching elements is connected to a last stage within the first plurality of switching elements and a last dilated stage within the second plurality of switching elements is connected to a plurality of outputs associated with a plurality of destinations.

15. The switch unit of claim 14 further comprising a buffer, wherein the first output of the concentrator network is connected to the batcher sorting network through the buffer and a second portion of the plurality of sorted data packets are stored within the buffer for a period of time before being sent to the batcher sorting network.

16. The switch unit of claim 15, wherein the period of time is selected to coincide with a time slot in which another plurality of data packets arrive at the plurality input such that the second portion of the plurality of sorted data packets are sent to the batcher sorting network as another plurality of data packets arrive at the plurality of input port controllers.

17. The switch unit of claim 14 further comprising linking means for linking the plurality of outputs into a plurality of linked outputs, wherein each linked output within the plurality of linked outputs includes at least two outputs, wherein a data packet having a destination that is associated with a linked output having at least two outputs is routed to at least one of the two outputs, wherein a capacity for a number of data packets that are routed to a destination is increased.

18. The switch unit of claim 17, wherein the linking means includes a control means, responsive to receiving a data packet at an input having an identification associated with a linked output, for identifying outputs within the plurality of outputs constituting the linked output and routing the data packet to the identified outputs.

19. The switch unit of claim 14, wherein each switching network includes a plurality of spare switching elements in which at least a portion of the plurality of spare switching elements are activated in response to a failure of a switching element within a switching network.

20. The switch unit of claim 19, wherein each switching network includes a plurality of spare links connecting the first plurality of switching elements and the second plurality of switching elements within the switching network, a portion of the spare links being used to route the plurality of data packets in response to a failure of a portion of the first plurality of switching elements within the switching network.

21. The switch unit of claim 14, wherein the plurality of data packets is a plurality of data packets.

22. The switch unit of claim 21, wherein the plurality of data packets is a plurality of asynchronous transmission mode data packets.

23. The switch unit of claim 14, wherein the switch unit is located in a satellite switch.

24. The switch unit of claim 14, wherein the switch unit is located in a terrestrial switch.

25. The switch unit of claim 14, wherein each of the plurality of outputs associated with a destination is connected to an output port controller having a multiplexer and a buffer, wherein data packets are stored in the buffer until transferred from the switch.

26. An apparatus for routing data packets comprising:
a plurality of outputs;
a batcher sorting network connected to the plurality of outputs and having an output;
a plurality of switching networks connected to the batcher sorting network, each switching network within the plurality of switching networks including:
a first plurality of switching elements arranged in a number of stages, wherein each stage within the number of stages has a number of switching elements from the plurality of switching elements and a first stage within the number of stages is connected to the plurality of outputs; and a second plurality of switching elements arranged to form a number of dilated stages, wherein a first dilated stage within the second plurality of switching elements is connected to a last stage within the first plurality of switching elements and a last dilated stage within the second plurality of switching elements is connected to a plurality of outputs.

27. The apparatus of 26, wherein the output of the batcher sorting network is connected to the plurality of switching networks by an output contest network having an input connected to the output of the batcher sorting network and an output connected to the plurality of switching networks.

28. The switch of claim 27, wherein the output of the output contest network is connected to the plurality of switching networks by a concentrator having an input connected to the output contest network and an output connected to the plurality of switching networks.

29. The apparatus of claim 28, wherein the plurality of switching networks is connected to the plurality of outputs by a plurality output port controllers.

30. The apparatus of claim 29, wherein each output port controller within the plurality of output port controllers includes a multiplexer and a buffer.

31. A communication system comprising:
a plurality of switches, wherein at least one of the plurality of switches includes:
a plurality of outputs;
a batcher sorting network connected to the plurality of outputs and having an output;
a plurality of switching networks connected to the batcher sorting network, each switching network within the plurality of switching networks including:
a first plurality of switching elements arranged in a number of stages, wherein each stage within the number of stages has a number of switching elements from the plurality of switching elements and a first stage within the number of stages is connected to the plurality of outputs; and
a second plurality of switching elements arranged to form a number of dilated stages, wherein a first dilated stage within the second plurality of switching elements is connected to a last stage within the first plurality of switching elements and a last dilated stage within the second plurality of switching elements is connected to a plurality of outputs;
a plurality of communications links, wherein the plurality of switches are connected to each other by the plurality of communications links; and
wherein data is transferred between the plurality of switches through the plurality of communications links;
a plurality of data processing systems located within different portions of the communication system, wherein data is sent from a first data processing system within the plurality of data processing systems to a second data processing system within the plurality of data processing systems using a portion of the plurality of switches and a portion of the plurality of communications links.

32. The communication system of claim 31, wherein at least one of the plurality of switches is a satellite switch and at least one of the plurality of switches is a terrestrial switch.

33. The communication system of claim 31, wherein the data transferred between the plurality of switches includes multimedia data.

* * * * *

UNITED STATES PATENT AND TRADEMARK OFFICE
CERTIFICATE OF CORRECTION

PATENT NO. : 5,949,778
DATED : Sep. 7, 1999
INVENTOR(S) : Abu-Amara et al.

It is certified that error appears in the above-identified patent and that said Letters Patent is hereby corrected as shown below:

In Col. 12, line 64, please delete "91.2" and insert –1.2–.

In Col. 18, please delete lines 7-9 (including equation), and insert the following equation and text:

-- $$\frac{N}{4}\left(\log_2 N + (\log_2 N)^2\right) + k\left(\frac{N}{2}\right)(\log_2 N + D)$$

On the other hand, for a NxN Pdl_DbDest switch with scaling, the hardware cost is as follows: --

Signed and Sealed this

First Day of August, 2000

Attest:

Attesting Officer

Q. TODD DICKINSON

Director of Patents and Trademarks